(12) United States Patent
Faurie et al.

(10) Patent No.: US 11,197,296 B2
(45) Date of Patent: *Dec. 7, 2021

(54) RESOURCE CONFIGURATIONS AND SCHEDULING IN MULTI-NETWORK ENVIRONMENTS

(71) Applicant: BlackBerry Limited, Waterloo (CA)

(72) Inventors: Rene Faurie, Versailles (FR); Stephen John Barrett, Haywards Heath (GB); Eswar Vutukuri, Havant (GB); Gordon Peter Young, Kineton (GB)

(73) Assignee: BlackBerry Limited, Waterloo (CA)

( * ) Notice: Subject to any disclaimer, the term of this patent is extended or adjusted under 35 U.S.C. 154(b) by 18 days.

This patent is subject to a terminal disclaimer.

(21) Appl. No.: 16/798,813

(22) Filed: Feb. 24, 2020

(65) Prior Publication Data
US 2020/0196312 A1 Jun. 18, 2020

Related U.S. Application Data

(63) Continuation of application No. 15/865,415, filed on Jan. 9, 2018, now Pat. No. 10,575,304.

(30) Foreign Application Priority Data

May 10, 2017 (WO) .................. PCT/IB2017/000709

(51) Int. Cl.
*H04W 72/04* (2009.01)
*H04W 76/14* (2018.01)
(Continued)

(52) U.S. Cl.
CPC ....... *H04W 72/0453* (2013.01); *H04L 5/0053* (2013.01); *H04W 4/70* (2018.02);
(Continued)

(58) Field of Classification Search
CPC ......... H04W 72/0453; H04W 72/1205; H04W 76/14; H04W 4/70; H04W 72/042;
(Continued)

(56) References Cited

U.S. PATENT DOCUMENTS

| 10,638,506 | B2 | 4/2020 | Faurie et al. |
| 2018/0262887 | A1 | 9/2018 | Futaki |
| 2019/0082459 | A1 | 3/2019 | Faurie et al. |

FOREIGN PATENT DOCUMENTS

| EP | 2161962 A1 | 3/2010 |
| EP | 3101969 A1 | 12/2016 |

OTHER PUBLICATIONS

3GPP TR 36.885 V14.0.0, Technical Report 3rd Generation Partnership Project, Technical Specification Group Radio Access Network, Study on LTE-based V2X Services (Release 14) (Jun. 2016) (216 pages).

(Continued)

*Primary Examiner* — Dady Chery
(74) *Attorney, Agent, or Firm* — Trop, Pruner & Hu, P.C.

(57) ABSTRACT

In some examples, by a first network node of a first network sends, in response to a request from a user equipment (UE) served by a second network, scheduling information to a second network node of the second network, the scheduling information granting a resource for use by the UE for a direct wireless transmission between the UE and a wireless device, where the first network is different from the second network, and where the sending of the scheduling information to the second network node of the second network is to cause the second network node of the second network to send the scheduling information to the UE.

24 Claims, 13 Drawing Sheets

(51) Int. Cl.
| | |
|---|---|
| H04L 5/00 | (2006.01) |
| H04W 4/70 | (2018.01) |
| H04W 72/12 | (2009.01) |
| H04W 4/46 | (2018.01) |
| H04W 88/02 | (2009.01) |
| H04W 88/08 | (2009.01) |
| H04W 4/44 | (2018.01) |

(52) U.S. Cl.
CPC ..... *H04W 72/042* (2013.01); *H04W 72/1205* (2013.01); *H04W 76/14* (2018.02); *H04W 4/44* (2018.02); *H04W 4/46* (2018.02); *H04W 88/02* (2013.01); *H04W 88/08* (2013.01)

(58) Field of Classification Search
CPC ......... H04W 4/44; H04W 88/08; H04W 4/46; H04W 88/02; H04L 5/0053
See application file for complete search history.

(56) References Cited

OTHER PUBLICATIONS

European Patent Office, International Search Report and Written Opinion for PCT/IB2017/000709 dated Jan. 25, 2018 (16 pages).
3GPP TS 23.285 V14.2.0 Technical Specification 3rd Generation Partnership Project; Technical Specification Group Services and System Aspects; Architecture enhancements for V2X services (Release 14) (Mar. 2017) (35 pages).
3GPP TS 23.303 V14.1.0 Technical Specification 3rd Generation Partnership Project; Technical Specification Group Services and System Aspects; Proximity-based services (ProSe); Stage 2 (Release 14) (Dec. 2016) (125 pages).
3GPP TS 36.331 V14.2.2 Technical Specification 3rd Generation Partnership Project; Technical Specification Group Radio Access Network; Evolved Universal Terrestrial Radio Access (E-UTRA); Radio Resource Control (RRC); Protocol specification (Release 14) (Apr. 2017) (722 pages).
ETSI TS 136 213 V14.2.0, LTE; Evolved Universal Terrestrial Radio Access (E-UTRA); Physical layer procedures (3GPP TS 36.213 version 14.2.0 Release 14) (Apr. 2017) (456 pages).
3GPP TS 23.203 V14.3.0 Technical Specification 3rd Generation Partnership Project; Technical Specification Group Services and System Aspects; Policy and charging control architecture (Release 14) (Mar. 2017) (261 pages).
3GPP TS 24.386 V14.0.0 Technical Specification 3rd Generation Partnership Project; Technical Specification Group Core Network and Terminals; User Equipment (UE) to V2X control function; protocol aspects;Stage 3 (Release 14) (Mar. 2017) (33 pages).
Bladsjo et al., Mobile Backhaul for Small Cells, Synchronization Aspects in LTE Small Cells, IEEE Communications Magazine, Sep. 2013 (8 pages).
3GPP TSG-RAN WG2 #96 Tdoc R2-168644 Reno, Nevada, USA, Agenda Item: 8.13.7, Source: Ericsson, Title: Inter-PLMN Operations for V2V Document for: Discussion, Decision, Nov. 14-18, 2016 (4 pages).
NGMN—Next Generation Mobile Networks, A Requirement Specification by the NGMN Alliance, NGMN Optimised Backhaul Requirements, Aug. 14, 2008 (29 pages).
Fricke et al., Requirements of 4G-Based Mobile Broadband on Future Transport Networks, Journal of Telecommunications and Information Technology, Feb. 2012 (8 pages).
U.S. Department of Transportation, Dedicated Short-Range Communications Roadside Unit Specifications www.its.dot.gov/index.htm Apr. 28, 2017 FHWA-JPO-17-589 (126 pages).
3GPP TS 36.306 V14.2.0 Technical Specification 3rd Generation Partnership Project; Technical Specification Group Radio Access Network; Evolved Universal Terrestrial Radio Access (E-UTRA); User Equipment (UE) radio access capabilities (Release 14) (Mar. 2017) (76 pages).
3GPP TS 36.322 V14.0.0 Technical Specification, 3rd Generation Partnership Project; Technical Specification Group Radio Access Network; Evolved Universal Terrestrial Radio Access (E-UTRA); Radio Link Control (RLC) protocol specification (Release 14) (Mar. 2017) (45 pages).
3GPP TS 36.423 V14.2.0 Technical Specification 3rd Generation Partnership Project; Technical Specification Group Radio Access Network; Evolved Universal Terrestrial Radio Access Network (E-UTRAN); X2 application protocol (X2AP) (Release 14) (Mar. 2017) (242 pages).
3GPP TS 36.321 V14.2.1 Technical Specification 3rd Generation Partnership Project; Technical Specification Group Radio Access Network; Evolved Universal Terrestrial Radio Access (E-UTRA); Medium Access Control (MAC) protocol specification (Release 14) (Mar. 2017) (106 pages).
3GPP TS 36.212 V14.2.0 Technical Specification 3rd Generation Partnership Project; Technical Specification Group Radio Access Network; Evolved Universal Terrestrial Radio Access (E-UTRA); Multiplexing and channel coding (Release 14) (Mar. 2017) (197 pages).
3GPP TS 36.304 V14.2.0 Technical Specification 3rd Generation Partnership Project; Technical Specification Group Radio Access Network; Evolved Universal Terrestrial Radio Access (E-UTRA); User Equipment (UE) procedures in idle mode (Release 14) (Mar. 2017) (50 pages).
3GPP TS 36.323 V14.2.0 Technical Specification 3rd Generation Partnership Project; Technical Specification Group Radio Access Network; Evolved Universal Terrestrial Radio Access (E-UTRA); Packet Data Convergence Protocol (PDCP) specification (Release 14) (Mar. 2017) (43 pages).
3GPP TS 36.300 V14.2.0 (Mar. 2017) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14) (Mar. 2017) (331 pages).
European Patent Office, Communication pursuant to Article 94(3) EPC for Appl. No. 17730921.8 dated Nov. 13, 2020 (8 pages).

RESOURCE CONFIGURATIONS AND SCHEDULING IN MULTI-NETWORK ENVIRONMENTS

CROSS REFERENCE TO RELATED APPLICATION

This application is a continuation of U.S. application Ser. No. 15/865,415, filed Jan. 9, 2018, U.S. Pat. No. 10,575,304, which claims the benefit of International Appl. No. PCT/162017/000709, filed May 10, 2017, which are hereby incorporated by reference.

BACKGROUND

Wireless devices can communicate with each other through a wireless access network. The wireless devices can establish wireless links with wireless access network nodes of the wireless access network, after which each wireless device can communicate data with the wireless access network. Communication of data between wireless devices can be accomplished by a source wireless device sending the data to the wireless access network, which then forwards the data to a destination wireless device.

A different type of wireless communication between wireless devices involves Device to Device (D2D) communication. In a D2D communication, wireless devices that are in sufficiently close proximity to each other can send data directly to each other, without first sending the data to wireless access network nodes. The establishment of a D2D link between wireless devices can still be controlled by the wireless access network.

BRIEF DESCRIPTION OF THE DRAWINGS

Some implementations of the present disclosure are described with respect to the following figures.

Figure 1:
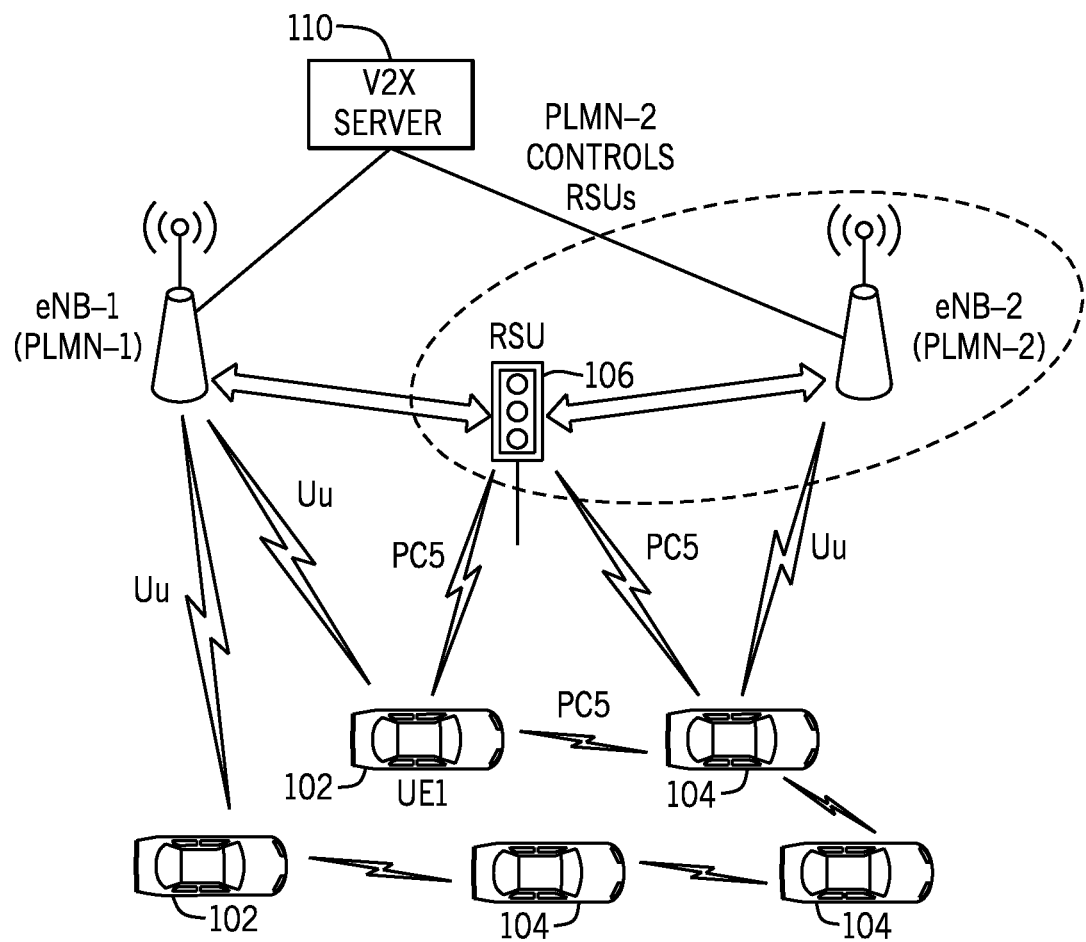
FIG. 1 is a block diagram of an example network arrangement according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Device to Device (D2D) communications can be according to D2D Proximity-based Services (ProSe), as defined by the Third Generation Partnership Project (3GPP). ProSe is provided as part of the Long-Term Evolution (LTE) standards implemented by 3GPP. The LTE standards are also referred to as the Evolved Universal Terrestrial Radio Access (E-UTRA) standards.

Although reference is made to LTE standards in some examples, it is noted that in alternative examples, other communication protocols can be employed, including new generation radio access protocols, such as 3GPP New Radio (NR), fifth generation (5G) communication protocols, Wireless LAN (e.g. Wi-Fi®) protocols, and so forth.

ProSe provides features that extend existing network coverage and permit the transport of radio communications in the absence of a reachable wide area network, such as when a wireless device is in a building basement or other obstructed area, or when a network infrastructure failure has occurred. ProSe communications can also be applied to vehicular communications for road safety and traffic information applications, where vehicular communications can include Vehicle-to-Vehicle (V2V) communications, Vehicle-to-Pedestrian (V2P) communications, Vehicle-to-Infrastructure (V2I) communications, Vehicle-to-Network (V2N) communications, and so forth. As used here, a vehicle can refer to any or some combination of a truck, a trailer, a tractor, a car, a railed vehicle (e.g., a train), a watercraft (e.g., a ship), an aircraft, a spacecraft, or any other moveable structure that can carry cargo or people.

Sidelink refers to a ProSe radio communications scheme, and by extension the related set of protocols, over a PC5 interface (user equipment (UE) to UE interface). ProSe sidelink communications can be used for Vehicle-to-Everything (V2X) communications, where V2X communications refer to any one or more of V2V communications, V2P communications, V2I communications, V2N communications, and so forth.

Although reference is made to V2X communications in some examples, it is noted that implementations according to some examples of the present disclosure can be applied to communications involving other types of wireless devices, including smartphones, tablet computers, notebook computers, desktop computers, game appliances, Internet of Things (IoT) devices, wearable devices (e.g., smart watches, smart eyeglasses, head-mounted devices, etc.), and so forth. As used here, a "UE" can refer to any wireless device. In some cases, a UE can be associated with a user, such as when the user carries the UE or otherwise uses the UE. In other examples, a UE can refer to a wireless device that is not associated with a user when communicating data, such as IoT devices including any or some combination of sensor devices, thermostat control devices, household appliances, vehicles (or electronic devices in vehicles), and so forth.

Vehicles can communicate with roadside units (RSUs), such as traffic light equipment (which controls traffic lights at road intersections), toll equipment (for collecting tolls along roads), or any other type of equipment that can be provided along a road over which vehicles can travel. Such communications between vehicles and RSUs are examples of V2I communications. More generally, RSUs can be referred to as Intelligent Transportation System (ITS) stations that are able to communicate with various UEs, including vehicles or other types of wireless devices. An ITS station refers to a station that provides tasks relating to information and communication technologies that enable and facilitate the safe and efficient transport of people and goods, including V2X communications.

RSUs can provide road safety services, such as over the 5.9 GHz carrier spectrum (an unlicensed spectrum from the perspective of an LTE access network) allocated for ITS over the PC5 interface or other D2D interfaces. RSUs can also provide other services for vehicles. Services offered by an RSU to a UE can be referred to as V2X services.

Although reference is made to communications between vehicles (or UEs) and RSUs, it is noted that implementations according to some examples of the present disclosure can be applied to other types of communications between a first wireless device and a second wireless device (or communications among more than two wireless devices), where a "wireless device" can refer to a UE, a network node, or any other device capable of wireless communications.

In some cases, a UE and an RSU can be controlled by different networks. In some examples, the networks are public land mobile networks (PLMNs). A PLMN can be identified by a mobile country code (MCC) and a mobile network code (MNC). A PLMN is established and operated by a network operator. Different PLMNs may be operated by different network operators, or in some cases, a network operator can operate more than one PLMN.

More generally, a "network" can refer to an arrangement of network infrastructure equipment that provides a coverage area within which a wireless device is able to obtain services, including communication of data or other services. A network can be operated by a respective network operator. Two networks are separate or distinct from one another if the networks are operated by different network operators, or if the networks employ different radio access technologies, or if the networks otherwise are operated as distinct network infrastructures.

FIG. 1 shows an example arrangement that involves multiple networks. In FIG. 1, various UEs (which in the example of FIG. 1 include vehicles) are depicted, where the UEs can communicate with respective wireless access network nodes, which for LTE are referred to as Evolved Node Bs or Evolved NodeBs (eNBs) or new generation NodeBs (gNBs). In the example of FIG. 1, UEs 102 are served by a first PLMN (PLMN-1), which includes eNB-1. Although just one eNB is shown in FIG. 1 for PLMN-1, it is noted that in other examples, PLMN-1 can include multiple eNBs.

FIG. 1 also shows a second PLMN, PLMN-2, which includes eNB-2 (in other examples, more than one eNB-2 can be present). In the example of FIG. 1, UEs 104 are served by PLMN-2. In addition, an RSU 106 is controlled by PLMN-2. In other examples, multiple RSUs can be controlled by PLMN-2.

As shown in FIG. 1, UE-to-UE communications over PC5 interfaces can be performed among the various UEs 102, 104 shown in FIG. 1. Moreover, UEs can also communicate with the RSU over a PC5 interface. A PC5 interface is an example of a direct wireless link between UEs or between a UE and another wireless device such as an RSU. A direct wireless link bypasses a network infrastructure node for communication of data.

A communications link may be established between a UE and a respective eNB over a radio interface referred to as a Uu interface, which is the radio interface between a UE and a radio access network, or more specifically, a E-UTRA Network (E-UTRAN).

From the perspective of UE1 (which is one of the UEs 102), PLMN-1 is the serving PLMN (also referred to as "PLMN-S") that controls services provided to UE1. PLMN-S can be the home PLMN of UE1, a visited PLMN of UE1, or an equivalent PLMN (equivalent to the home PLMN or the visited PLMN), where an equivalent PLMN is identified as being equivalent to another PLMN. UE1 is camped on a cell of PLMN-1 that provides various services, including cellular connectivity, infotainment, etc., over the Uu interface.

UE1 is served by the home PLMN of UE1 when UE1 is in the coverage area provided by the home PLMN. When UE1 moves away from the coverage area of the home PLMN, UE1 can connect to a visited PLMN.

In the example of FIG. 1, PLMN-S for UE1 is different from the PLMN that controls the RSU 106. The PLMN that controls the RSU 106 is referred to as "PLMN-V" in FIG. 1, where PLMN-V controls communications performed by the RSU 106, and possibly other RSUs and related PC5/sidelink resources on the V2X frequency used for providing transportation services, such as road safety services or other transportation services. PC5/sidelink resources refer to resources, such as channels, subframes, or any other frequency-based and/or time-based resources that can be used to perform sidelink communications between UEs and RSUs, or more generally, direct wireless communications between one wireless device and another wireless device.

The V2X frequency refers to the frequency, or frequency band, that is used to perform V2X communications. For example, the V2X frequency can be part of the 5.9 GHz carrier spectrum.

Note that in the example of FIG. 1 PLMN-S for UE1 does not control the PC5/sidelink resources on the V2X frequency used to provide transportation services.

In the example of FIG. 1, a V2X server 110, that could be referred to as a V2X application server in other examples, can provide V2X services for the UEs through respective eNBs (including eNB-1 and eNB-2). UEs 102 or 104 can communicate with the V2X server 110 through the respective eNB-1 or eNB-2.

UEs camped on or connected to an eNB in a given PLMN and a given geographic area may be preconfigured with a description of sidelink receive and transmit resource pools used for V2X communications in this geographic area. Receive and transmit resource pools, also referred to as reception pools and transmission pools, respectively, refer to pools of resources (e.g., frequency resources and/or time resources) that can be used for receiving or transmitting data of V2X communications. However, solutions are not available to coordinate sidelink resource sharing between different networks, such as different PLMNs, especially if the resource configuration can vary dynamically (e.g., for load sharing between resources used for transmission by UEs of different PLMNs, or for congestion control).

In addition, for transmitting messages to a RSU for a given V2X service, a UE of any PLMN, while camped on a cell of this or of an equivalent PLMN, is to be indicated with the V2X radio resources allocated (granted) for sidelink communications from the UE to the RSU. According to a current LTE standard, the UEs receive scheduling information identifying the sidelink resources allocation (alternatively referred to as a sidelink grant) through an (Enhanced) Physical Downlink Control Channel, or (E)PDCCH, of the serving cell the UE is camped on, and there is no available mechanism by which the scheduling of shared sidelink resources allocated to UEs camping on different PLMNs can be distributed or dynamically coordinated between these PLMNs.

Example implementations according to the present disclosure enable a UE to remain connected to its serving PLMN while still being able to operate on V2X sidelink resources that are dynamically scheduled in a coordinated manner, by a different PLMN.

Figure 2A:
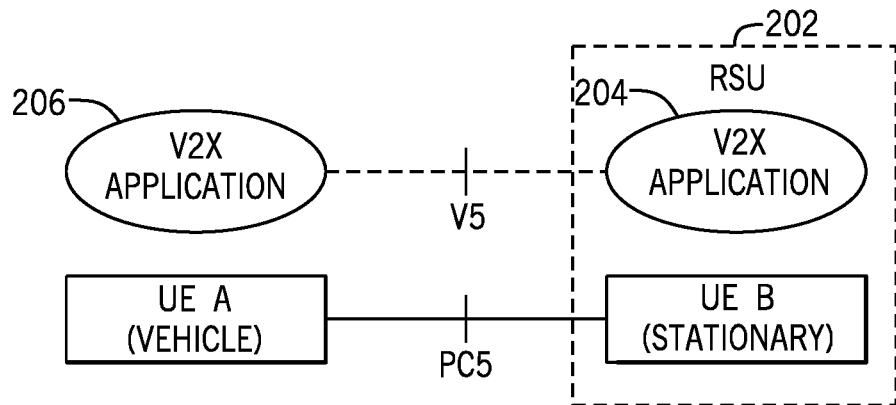
FIGS. 2A and 2B are block diagrams illustrating respective different types of roadside units, according to some examples.

Two types of RSUs are described in the current LTE standards. A first type of RSU is referred to as a "UE-type RSU," while a second type of RSU is referred to as an "eNB-type RSU." FIG. 2A shows an example arrangement depicting a connection between UE A (e.g., a vehicle) and a UE-type RSU 202, which includes UE B and a V2X application 204, which refers to logic (in the form of machine-readable instructions such as software or firmware) executable by UE B to provide V2X services. A V2X application 206 is executable on UE A. The V2X applications 204 and 206 can interact over a V5 interface, and UE A and the RSU 202 communicate over a PC5 interface.

Figure 2B:
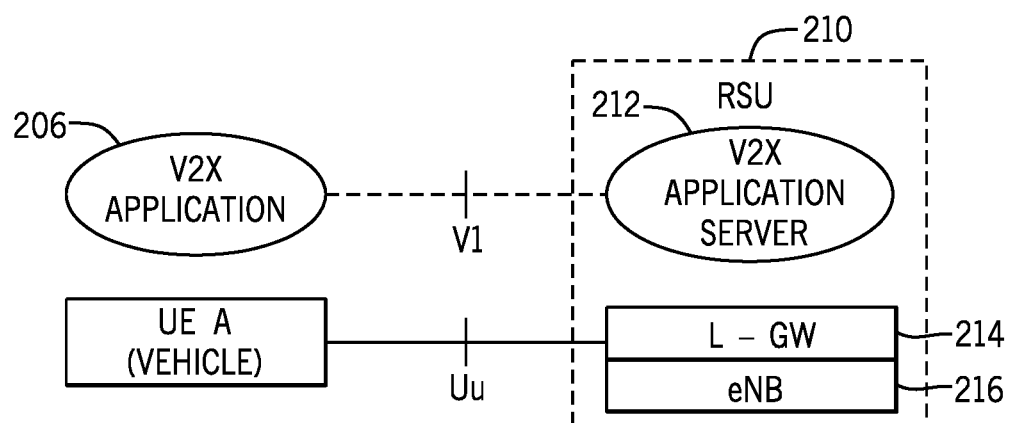

FIG. 2B shows an example arrangement depicting a connection between UE A (e.g., a vehicle) and an eNB-type RSU 210, which includes a V2X application server 212 for providing V2X services, a local gateway (L-GW) 214, and an eNB 216. The eNB 216 communicates with UE A over a Uu interface. The V2X application 206 interacts with the V2X application server 212 over a V1 interface.

While a regular eNB or an eNB-type RSU (e.g., 210 in FIG. 2B) can configure (using Radio Resource Control (RRC) signaling) and schedule (using a Medium Access Control (MAC) layer) sidelink resources to a UE connected to the eNB or eNB-type RSU over the Uu interface, such interactions are not specified for or applicable to the PC5 interface between a UE-type RSU (e.g., 202 in FIG. 2A) and a UE, according to the current LTE standards.

On the other hand, a sidelink connectivity is not specified or applicable between an eNB or an eNB-type RSU and a UE, which are connected through a Uu interface. This restriction precludes the fulfillment of certain connectivity requirements in a multi-PLMN scenario as depicted in FIG. 1.

If the V2X sidelink resources are scheduled by an eNB in a network (e.g., PLMN-2 in FIG. 1) controlling an RSU, the RSU needs to be made aware of the resources allocated (granted) for sidelink transmissions from the RSU to the UEs, and of the reception pools configured for sidelink transmissions from the UEs to the RSU.

If the V2X sidelink resources are scheduled by the RSU, a UE needs to be made aware of the resources allocated (granted) for sidelink transmissions from the UE to the RSU, and of the reception pools configured for sidelink transmissions from the RSU to the UE.

While exchanging sidelink resource configuration or allocation information over the Uu interface between a UE-type RSU and an eNB could be considered, such a possibility would consume radio resources in the licensed spectrum of the mobile network operator and as such may not be desirable in certain circumstances.

In addition, it should be observed that a UE cannot be simultaneously connected (attached) to multiple PLMNs through the Uu interface according to current LTE standards.

Example Implementations of the Present Disclosure

Figure 3:
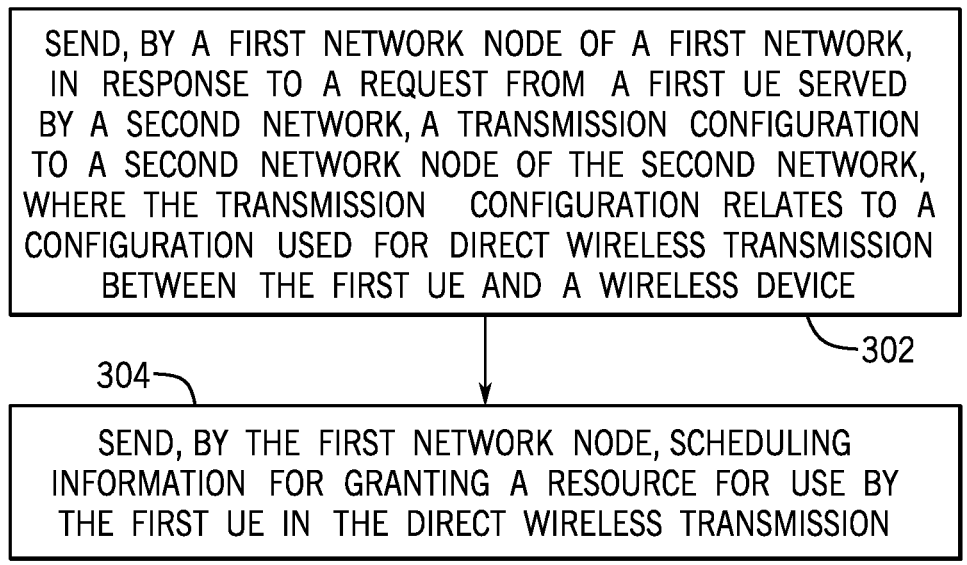
FIG. 3 is a flow diagram of an example process according to some implementations.

As shown in FIG. 3, to address the issue of the UE being connected to a second network that is different from a first network that controls resources for direct wireless transmissions such as V2X transmissions, a first network node (which can be an eNB or an RSU) of the first network sends (at 302), in response to a request from a first UE served by the second network, a transmission configuration to a second network node of the second network, where the transmission configuration relates to a configuration used for direct wireless transmission between the first UE and a wireless device (e.g., an RSU).

The first network node further sends (at 304) scheduling information for granting a resource for use by the first UE in the direct wireless transmission. In some examples, the scheduling information can be sent by the first network node to the second network node to forward to the first UE. In other examples, the scheduling information can be sent by the first network node directly to the first UE.

A UE performing sidelink communications can operate in a network scheduled mode (also referred to as sidelink mode 3 in some examples). In the network scheduled mode, the UE transitions to an RRC_CONNECTED state, provided the UE was not already in this state, to communicate (transmit or receive) data, where the RRC_CONNECTED state is a state where the UE has established an RRC connection with the wireless access network (e.g., an E-UTRAN). Also, in the network scheduled mode, the UE requests sidelink related transmission resources from the network, and the network schedules resources for transmission of sidelink control information and data. Collision free transmissions are possible in the network scheduled mode since the network controls the transmissions over the PC5 interface.

For the network scheduled mode, different types of information are provided on the transmitter and on the receiver sides. In some cases, the transmitter can be a UE that transmits to an RSU (a receiver). In other cases, the transmitter can be an RSU that transmits to a UE (a receiver).

In other examples, a UE can operate in an autonomous mode (also referred to as sidelink mode 4 in some examples), in which the UE autonomously selects resources from resource pools and performs transport format selection to transmit sidelink control information and data.

In some embodiments, for transmissions from UEs to the RSU, the different UEs are allocated resources for transmissions that are orthogonal between the UEs to avoid collisions. A scheduler located on the network side (for example, located in an eNB or in an RSU) can be used and the allocated resources are communicated to the UEs. Information sent by the scheduler can include:

1) A transmission pools configuration, referred to as "SL POOLS INFO" in FIGS. 4, 6, 8, and 9. In some examples, the transmission pools configuration can be carried in a SL-CommResourcePoolV2X according to 3GPP TS 36.331.
2) A resource allocation (e.g., a frequency resource and/or a time resource) within the transmission pools, such as the information described for example by a Downlink Control Information (DCI) format 5A according to 3GPP TS 36.212 LTE standards. The resource allocation may be referred to as "SL SCHEDULING" in FIGS. 4, 6, 8, and 9.

The scheduling information sent by the first network node in task 304 of FIG. 3 can include the resource allocation noted above, in some examples.

In addition, sidelink transmission configuration parameters can be sent to a UE, where sidelink transmission configuration parameters can include any or some combination of the following: a parameter relating to a modulation and coding scheme (MCS), MAC configuration parameters to configure a MAC layer, one or more priority values associated with logical channels to be used, and so forth. In FIGS. 4, 6, 8, and 9, such sidelink transmission configuration parameters may be referred to as "SL TX CONFIGURATION" or "SL TX CONFIG".

The transmission configuration sent by the first network node in task 302 of FIG. 3 can include one or more of the sidelink transmission configuration parameters noted above.

For transmissions from the RSU to the UEs, the scheduler located in the RSU or in the controlling eNB can ensure resource orthogonality of the radio resources under its control, and each UE can determine the resource granted from the Sidelink Control Information (SCI) received from the RSU.

For reception, a receiver needs to know the resources where sidelink information can be received, generally referred to as reception pools, i.e. the resources that the receiver needs to monitor. A reception pool refers to a pool of resources that a receiver uses to receive data.

According to current LTE standards, pool configuration information and sidelink transmission parameters may be preconfigured, and/or may be provided to the UE using RRC signaling (over the Uu interface, for example). In addition, real time scheduling can be realized by MAC signaling (over the Uu interface) between the eNB and the UE.

In some examples, the aim of some example implementations according to the present disclosure is to perform any one or more of the following:
1) Coordinate the configuration of the transmit and receive resource pools used for sidelink communications between V2X devices camped on different serving PLMNs and the RSU.
2) Coordinate the allocation (scheduling) of sidelink resources for the transmission from V2X devices camped on different serving PLMNs to the RSU.
3) If multiple RSUs with overlapping radio coverage are controlled by a given eNB, coordinate resources for sidelink transmission between these RSUs and the different UEs within the RSUs coverage In some examples, two different RSU architectures are applicable to the example implementations according to the present disclosure:
1) An UE-type RSU (FIG. 2A) that provides V2X services to UEs through a first radio interface such as a PC5 interface while being connected to a wireless access network (eNBs) through a second radio interface such as a Uu interface. Implementation 2c discussed below addresses this RSU architecture.
2) A new hybrid-type RSU providing V2X services to UEs through a radio interface such as a PC5 interface (as a UE-type RSU) while being connected to the eNBs through a network interface such as an X2 or similar interface (as an eNB-type RSU). Implementations 2a, 2b, and 3 discussed below addresses this hybrid-type RSU. In some examples, benefits of a hybrid-type RSU can include any one or more of the following. The hybrid-type RSU enables RSU connectivity to neighbor eNBs through an existing interface type (e.g., an X2 interface). A hybrid-type RSU enables RSU connectivity with multiple networks (e.g., PLMNs). A hybrid-type RSU may avoid the use of Uu interfaces over a licensed spectrum. A licensed spectrum refers to a frequency spectrum that is licensed, by government regulatory agencies and/or standards bodies, for use by a network to deliver services. An unlicensed spectrum refers to a frequency spectrum that is outside the licensed spectrum.

For simplicity, the terms "pool" or "resource pools" may be used in the context of sidelink scheduled mode resource transmission to designate radio resources that are configured for and used by a scheduler.

Implementation 1

Resources used for sidelink transmissions for UEs served by different networks (e.g., PLMNs) are shared or partitioned among the different networks. The related pools, and their corresponding frequencies, should be controlled by the network controlling RSUs.

Single (shared) or multiple pools may be used, such as for different V2X services, and/or for the UEs served by different PLMNs, etc. For example, a transmission pool may be partitioned into separate frequencies ("sub-channels"), where each partition is used for transmissions by UEs served by different PLMNs. Alternatively, or in combination, pools may be partitioned in time (e.g., UEs of different PLMNs are allocated different sub-frames).

Information related to how the resources are coordinated, shared or partitioned is preconfigured (or provisioned) in the respective network nodes and UEs. If dynamic adjustments of the resources are provided, the dynamic resource adjustments may be signaled as control information between network nodes (over network interfaces), between a network node and UEs (e.g., over a radio interface such as an Uu interface), between an RSU and UEs, or between UEs (e.g., over a radio interface such as a PC5 interface).

One or more resource pool configuration techniques that are part of Implementation 1 enable coordinated PC5 scheduling for UEs pertaining to different networks, and can be used with any of implementations 2a, 2b, and 2c discussed below.

As discussed further above, both RSUs and UEs pertaining to different networks are to be provided with information describing the pool(s) or partition(s) to be used for sidelink transmission and reception. This information should generally not change in a very dynamic manner. A resource configuration change may be triggered, e.g., by a frequency plan change, traffic volume variations or congestion conditions.

One or a combination of the following sets of techniques can be considered for coordinating pools or pool partitions.
1) A first set of techniques can use pre-configuration or provisioning techniques described in 3GPP TS 23.285. For example, a V2X Control Function can be used to provision the UE with parameters to use V2X communications. The V2X Control Function can provision the UEs with PLMN-specific parameters that allow the UE to use V2X in a specific PLMN. The V2X Control Function can also be used to provision the UE with parameters that are used when the UE is not served by a wireless access network (e.g., E-UTRAN). For example, parameters that can be provisioned for V2X communications over the PC5 interface may include an authorization policy (relating to when the UE is authorized to perform V2X communications over the PC5 interface), radio parameters (e.g. frequency bands) with geographical area(s) that are to be configured in the UE to be able perform V2X communications over a PC5 reference point when not served by an E-UTRAN, and so forth. For example, the parameters can be provisioned in the Universal Integrated Circuit Card (UICC) or management engine (ME), using Open Mobile Alliance (OMA) Device Management (DM), over a V3 interface by the V2X Control Function, over a V1 interface by an application server, by operation and management (O&M), over proprietary or non-standardized interfaces, and so forth.

2) A second set of techniques may use signaling of control information from a network to UEs, for example:
   a. Signaling from a network to UEs (case a) may include system information broadcast by the network or the PLMN (e.g. eNBs) controlling the RSUs. In this case a, UEs attached to other networks or PLMNs may read the system information broadcast by the RSU's network (using additional receivers, gaps to read in other PLMNs, PLMN reselection, etc.).
   b. Signaling from a network to UEs (case b) may include system information broadcast in all cooperating networks. In this case b, the information may be communicated from the RSU's PLMN to other PLMNs, e.g., at the radio access network (RAN) level through an X2 interface between eNBs of different PLMNs or between a RSU and an eNB in another PLMN, through V2X control functions of the different PLMNs (e.g., using the V6 interface), through an IPX (IP Packet eXchange) interface between networks of different service providers. In this case b, the UEs do not have to read system information blocks (SIBs) of other networks.

Implementations for resource configuration (and allocation) may depend in part on whether the RSUs are able to control and configure the pools (or partitions) autonomously, or otherwise if pools configuration is performed by controlling eNBs or other network elements.

If RSUs are able to control and configure the pools (or partitions), an issue may arise if geographical radio coverage areas controlled by different RSUs are overlapping, and/or if the radio frequencies configured for transmission in neighbor or overlapping areas are overlapping or colliding. One solution to this issue is for example the definition of location-based pools using non-colliding radio resources assigned for transmission in neighbor zones.

In another example, if a controlling eNB is to control and configure the pools (or partitions), the eNB can coordinate the radio resources allocated to different RSUs in the eNB area, to avoid resource collisions and reduce interference.

Alternatively, a Self-Organizing Networks (SON) technique, or any similar adaptive technique, may be used to configure sidelink resources, such as by adjusting the resource bandwidth when a RSU is added or removed in the network, or depending on local load conditions.

If sidelink resources pools have to be reconfigured in a dynamic manner, procedures may be introduced or enhanced to not alter the V2X transmissions during transmission pools reconfiguration (e.g., by temporarily allowing the use of "exceptional pools" or other resource pools configured for this purpose). An exceptional pool of resources can refer to a resource pool that is used only in certain conditions, e.g., the exceptional pool may be associated with geographical locations, or the exceptional pool may be used during mobility of a UE between two neighbor cells or geographical zones.

Implementation 2a

Figure 4:
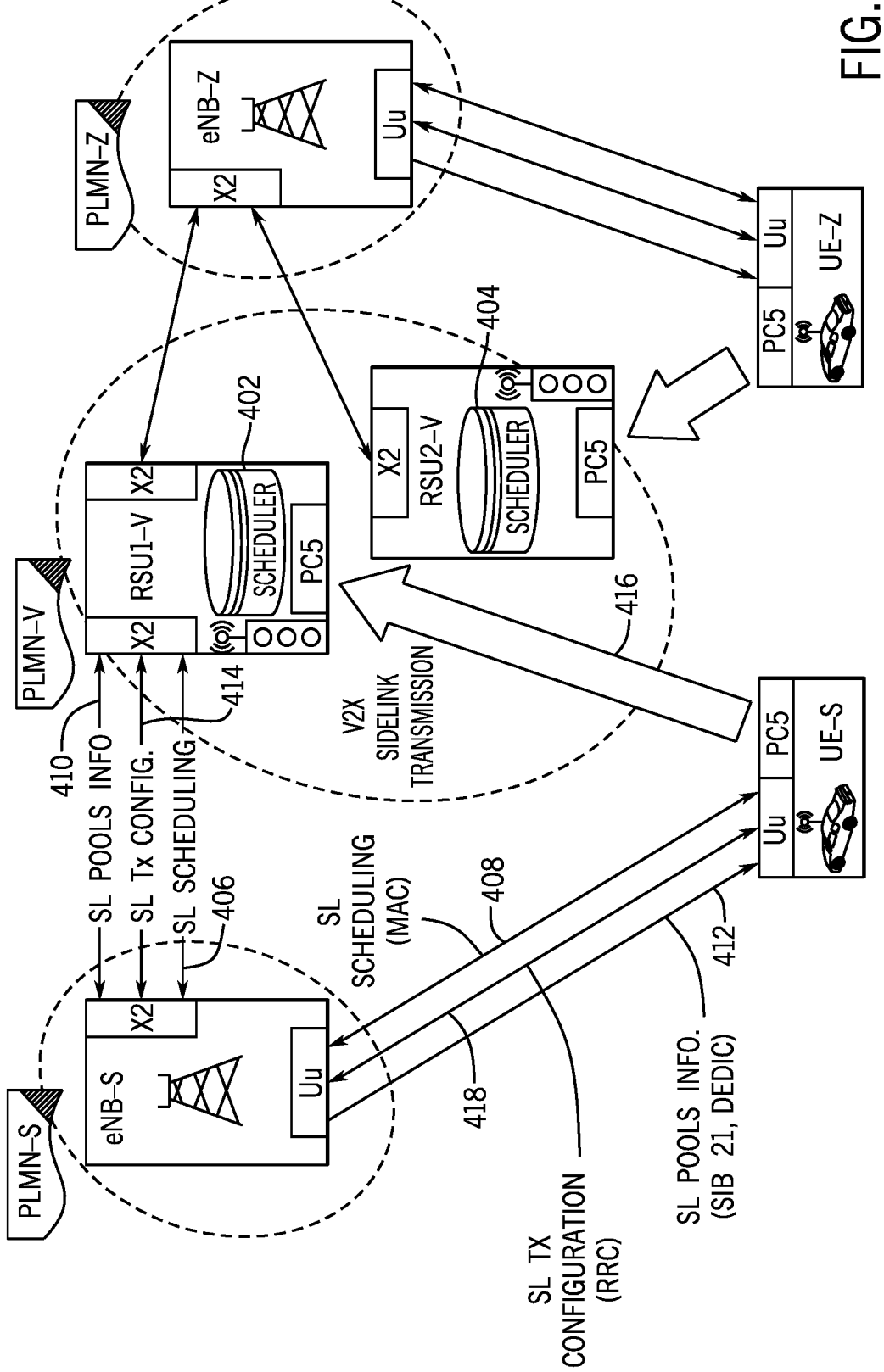
FIG. 4 is a block diagram of an example network arrangement that uses a first implementation according to some examples of the present disclosure.

FIG. 4 depicts an example arrangement to implement implementation 2a according to some techniques. In implementation 2a, a sidelink scheduler 402 is included in an RSU (e.g., RSU1-V), and the sidelink scheduler 402 schedules sidelink resources for UEs of all PLMNs (e.g., PLMN-S, PLMN-V, PLMN-Z) sharing RSU1-V for road safety V2X services or other types of transportation services in the RSU radio coverage area.

RSU1-V is controlled by PLMN-V providing V2X services, which also controls another RSU (RSU2-V), which also includes a sidelink scheduler 404.

RSU1-V is a hybrid-type RSU also connected to neighbor eNBs (e.g., eNB-S that is part of PLMN-S, and eNB-Z that is part of PLMN-Z), through interfaces such as X2 interfaces. In some examples, the X2 interface used can be an X2 variant that uses just a subset of messages and procedures of a full-fledged X2 interface (e.g., the subset includes the messages and procedures for sidelink resource coordination).

With implementation 2a, a sidelink scheduler is included in a hybrid-type RSU, and sidelink requests and grants are transmitted via a UE's serving eNB, e.g., eNB-S or eNB-Z.

FIG. 4 also shows a UE-S that is served by PLMN-S, and a UE-Z that is served by PLMN-Z. UE-S can perform V2X communications with RSU1-V, while UE-Z can perform V2X communications with RSU2-V. UE-S is camped on or connected to PLMN-S for obtaining home PLMN services (e.g., entertainment or other non-safety services via the Uu interface, as well as possibly via a PC5 interface for non-V2X services), and obtains V2X services provided by PLMN-V through RSU1N over a PC5 interface on the V2X frequency.

In the example arrangement depicted in FIG. 4, UE-S may send a request for V2X transmission to eNB-S. UE-S may also provide additional information as to whether the V2X transmission may necessitate an isolated resource (a dynamic resource for a single transmission), or a semi-persistent scheduling (SPS) resource, where certain allocations are repeating periodically. eNB-S may consequently forward the request and the additional information received from UE-S to RSU1-V over the corresponding X2 interface. Based on the received information, the sidelink scheduler (402) in RSU1-V may configure sidelink resource and allocate a single grant or a semi-persistent allocation, and transmit the configuration and the scheduling information to the requesting eNB (eNB-S), which in turn forwards the corresponding information to the requesting UE (UE-S).

FIG. 4 shows that RSU1-V and eNB-S may communicate a transmission pools configuration referred to as SL POOLS INFO (410). eNB-S may forward the transmission pools configuration (412) to UE-S, such as by using a System Information Block (SIB 21) or using dedicated RRC signaling. Additionally, configuration information, such as a transmission configuration information, may be communicated between RSU1-V and eNB-S, referred to as SL TX CONFIG (414), and between eNB-S and UE-S via RRC signaling, referred to as SL TX CONFIGURATION (418), for example. Additionally, information needed in the process of triggering and scheduling the sidelink resource communicated between RSU1-V, eNB-S and UE-S is referred to as SL SCHEDULING (406) and (408).

Once UE-S is provided with one or more transmission pools configuration (412), transmission configuration (418), and scheduling information (408), UE-S can perform a V2X sidelink transmission (416) to RSU1-V (using the PC5 interface between UE-S and RSU1-V).

A similar process is applicable to V2X sidelink communication between UE-Z and RSU2-V.

Figure 5:
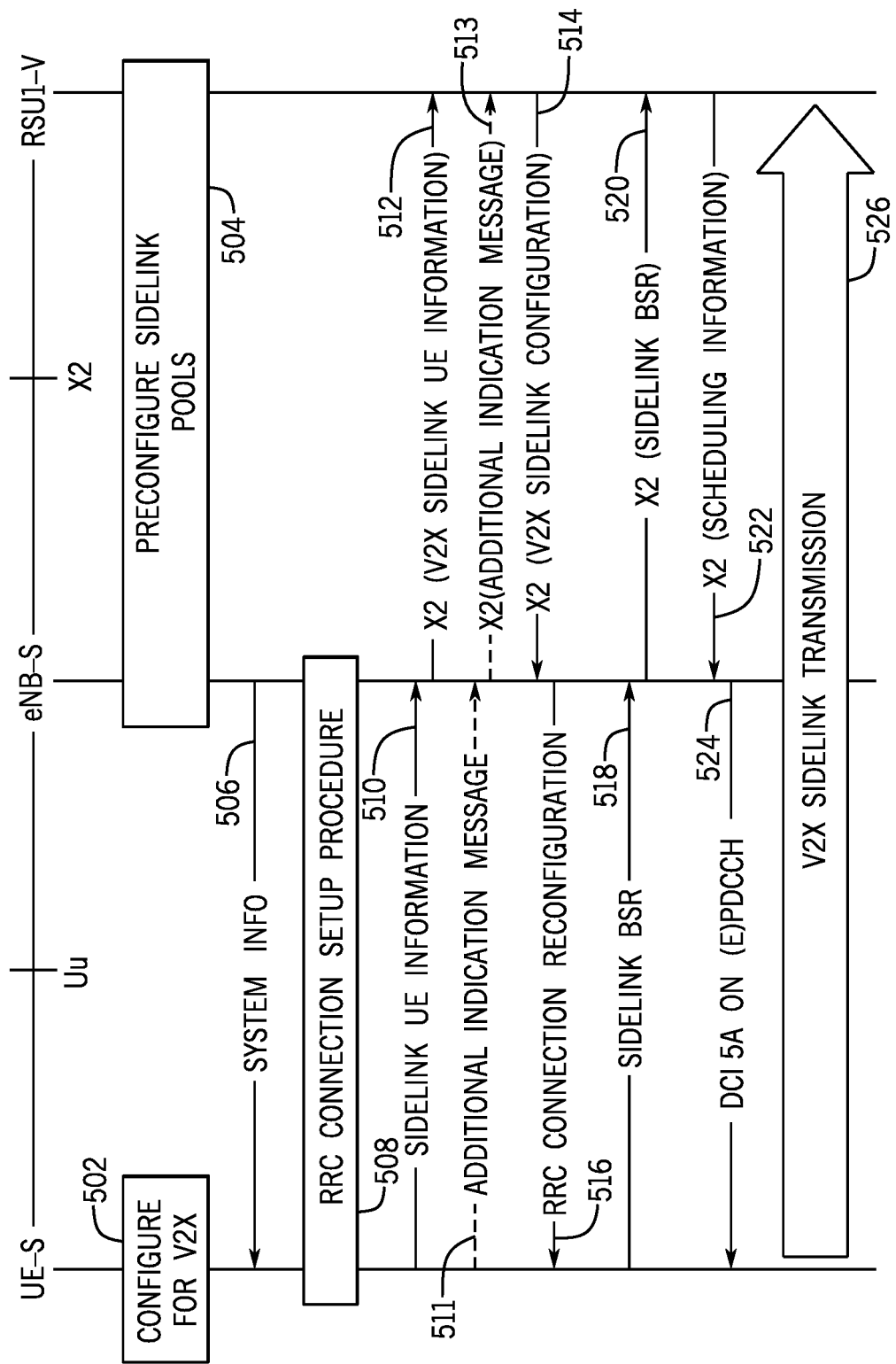
FIG. 5 is a flow diagram of a process performed in the network arrangement of FIG. 4, according to some implementations.

FIG. 5 is a message flow diagram depicting messages exchanged among UE-S, eNB-S, and RSU1-V and corresponding tasks, according to some examples. The tasks and messages are assigned reference numerals.

502: The UE (UE-S) capable of V2X sidelink communication is authorized and configured to use V2X services over a PC5 interface on the V2X frequency of the V2X PLMN (PLMN-V) providing road safety services (or more generally V2X services). UE-S is within the coverage area of PLMN-S, and is camped on a cell served by eNB-S. The UE is in either the RRC-IDLE state (no radio connection established yet) or RRC_CONNECTED state (radio connection has been established).

504: Both eNB-S of PLMN-S and RSU1-V of PLMN-V have been preconfigured (or provisioned) with pool information for V2X sidelink communications. Pool information may be exchanged over the X2 interface or configured using any of the techniques described in implementation 1.

506: If UE-S is in the RRC-IDLE state, UE-S acquires a system information, such as the system information in the SystemInformationBlockType21 (SIB 21) broadcast by the network, if UE-S does not have stored a valid version of this system information block. If UE-S is in the RRC-CONNECTED state, UE-S may acquire updated SIB 21 information. UE-S identifies the V2X sidelink radio resources (pools) to be used on the V2X frequency signaled by the network.

508: If UE-S is in the RRC-IDLE state, UE-S sets up an RRC connection and enters the RRC_CONNECTED state.

510: UE-S initiates transmission of a sidelink indication message (referred to as a SidelinkUEInformation message in some examples) to eNB-S, where the message indicates to the network that UE-S is interested in V2X sidelink communication on the V2X frequency, and possibly including a list of V2X services.

511: UE-S may initiate transmission of one or more additional indication messages, such as a UEAssistanceInformation message.

The sidelink indication message, or the one or more additional indication messages, may indicate whether UE-S is interested in dynamic sidelink transmission, in semi-persistent sidelink transmission, or in other sidelink transmission types that can be defined.

512, 513: Upon receipt of an indication message (sidelink indication message and/or one or more additional indication messages) sent by UE-S at 510 and/or 511, eNB-S may check whether UE-S is authorized to use sidelink for V2X on the requested frequency, and forwards part of or all the information included in the received indication to the relevant RSU, for example RSU1-V (such as by using a technique of implementation 4b discussed further below), in a second message, such as a X2 message over a corresponding X2 interface. One or more identities identifying the requesting UE (UE-S) and possibly the originating eNB (eNB-S) and/or PLMN-S may be included in the X2 message.

514: In response to the X2 message (512), RSU1-V sends back to the requesting eNB (eNB-S) over the X2 interface an X2 response message containing sidelink configuration information. The configuration information may include information indicating a network scheduled resource, providing pools of resources to be used on the V2X frequency (if different from the ones preconfigured and broadcast by the requesting eNB). The response message may optionally include transmission configuration information, such as the MCS to be used, a MAC buffer status reporting (BSR) configuration (and/or other type of MAC configuration), or priority values associated with the logical channels to be used. The foregoing information may include information specified by the SL-V2X-ConfigDedicated-r14 Abstract Syntax Notation One (ASN.1) structure for the scheduled mode of operation. Not all indication messages received from eNB-S may be answered by a configuration message response.

516: Upon receipt of the X2 response message (514), eNB-S sends to UE-S a configuration message, such as a RRCConnectionReconfiguration message, indicating a network scheduled resource. The configuration message may assign a radio identifier, such as a SL-V-RNTI (sidelink Radio Network Temporary Identifier for V2X) or a SL-V-SPS-RNTI for semi-persistent scheduling to UE-S, and may provide the V2X frequency and the associated pools of resources, together with any additional information (such as the transmission configuration) that may have been received from RSU1-V.

518: UE-S sends information to eNB-S, such as a sidelink BSR specified by the LTE standards, to request a sidelink resource for transmission. A BSR procedure is triggered by a UE to report pending data in the uplink to a network node to request transmission resources. If there is no uplink resource available to transmit the BSR, the UE may trigger a Scheduling Request (SR) procedure, which results in an uplink grant that allows transmission of the BSR.

In some implementations, a sidelink BSR is a MAC control element that includes the following fields for each reported target destination:

1) Destination Index: The Destination Index field identifies the ProSe Destination. The value is set to the index of the destination reported in a destinationInfoList information element provided by the network. For V2X, the destinationInfoList includes the V2X sidelink communication transmission destination(s) for which the UE has requested, in a SidelinkUEInformation message, an E-UTRAN to assign dedicated resources.
2) LCG ID: The Logical Channel Group ID field identifies the group of logical channel(s) for which buffer status is being reported.
3) Buffer Size: The size of the BSR buffer in a UE.

520: Upon receipt of the sidelink BSR (516), eNB-S forwards the received BSR message (or an equivalent form containing similar information) to RSU1-V in a second message, such as an X2 message over the corresponding X2 interface, together with the one or more identities defined at 512 or similar.

522: RSU1-V allocates V2X sidelink resource to the requesting UE and sends the scheduling information to the requesting eNB (eNB-S) in a message, such as an X2 message over the X2 interface. In some examples, this scheduling information may be encoded according to a DCI format 5A specified by the LTE standards, or according to any other form containing similar information. RSU1N may include timing and synchronization information, such as the time of the initial granted resource, and/or an offset between the interconnected PLMN clock systems or System Frame Numbers (SFNs).

524: Upon receipt of the X2 message (522), eNB-S forwards to UE-S the scheduling information received from RSU1-V. In some examples, the scheduling information may be encoded according to DCI format 5A or according to another format, and may be sent over an Uu interface on a (E)PDCCH channel with the cyclic redundancy check (CRC) scrambled with an SL-V-RNTI, an SL-V-SPS-RNTI or another identifier previously assigned. DCI format 5A may be used by an eNB to schedule transmission resources (control and data) for V2X sidelink communication in a network scheduled resource allocation mode (for example a sidelink mode 3). The DCI may be further adapted to provide resource allocation for SPS, for example may include an SPS process activation or deactivation command. The DCI may include timing or synchronization information. Alternatively, eNB-S may send the scheduling information within an RRC dedicated message to UE-S.

526: UE-S transmits its data on a radio channel such as a Sidelink Shared Channel (SL-SCH) over the PC5 interface, using the resource scheduled by RSU1-V and indicated by the serving eNB (eNB-S). In some examples, the V2X sidelink control information may be encoded according to an SCI format 1 specified by the LTE standards or an equivalent SCI format.

For messages sent at 512, 514, 520, or 522, specific X2 message types and formats may be defined, or existing messages may be adapted for this purpose.

In other examples, a variant may be considered for reducing the latency in case UE-S sends the SidelinkUEInformation message or another message for proceeding to an isolated or semi-persistent transmission. In this case, BSR information may be added to the message (510 and 512), and in return RSU1-V may allocate a sidelink resource and provide the scheduling information together with the V2X sidelink configuration (514), which is forwarded to the scheduled UE (UE-S) within the RRCConnectionReconfiguration message (516). UE-S will then use the scheduled resource without performing tasks 518, 520, 522, and 524.

Alternatively, or additionally, messages of tasks 510 and 512 may contain additional information about the transmission for which resources are requested. The additional information may include, for example, further QoS information, a periodic transmission interval, an information size, priority or emergency attributes, a low latency indicator, a time period during which a recurrent resource will be required for such low latency and/or emergency-priority transmission. In such case, RSU1-V may allocate a semi-persistent or over-allocated resource for a certain time duration, and provide the corresponding scheduling information in tasks 514 and 516. Again UE-S may use the scheduled resource without performing tasks 518, 520, 522, and 524.

Alternatively, or additionally, messages of tasks 510, 511, 512, and 513 may be transmitted at different occasions or with a different timing than depicted by the message flow diagram of FIG. 5, for example due to changes to the conditions of occurrence of the V2X transmission, or due to changes to transmission interval, or due to changes in information size, or due to changes to transmission priority, etc.

In some examples, a cross-carrier scheduling indication may be used by the eNBs to indicate to UEs that the carrier used for V2X services is different from the frequency used by the serving PLMN (resources on the V2X carrier is scheduled by a different node).

Sidelink resource allocation information for transmission may employ real time information transmission between the sidelink scheduler 402 and a remote device (e.g., UE-S) using the allocated resource. Different latency requirements (and treatment) can be considered, e.g., for dynamic (isolated) allocation and for SPS allocation.

Implementation 2b

Figure 6:
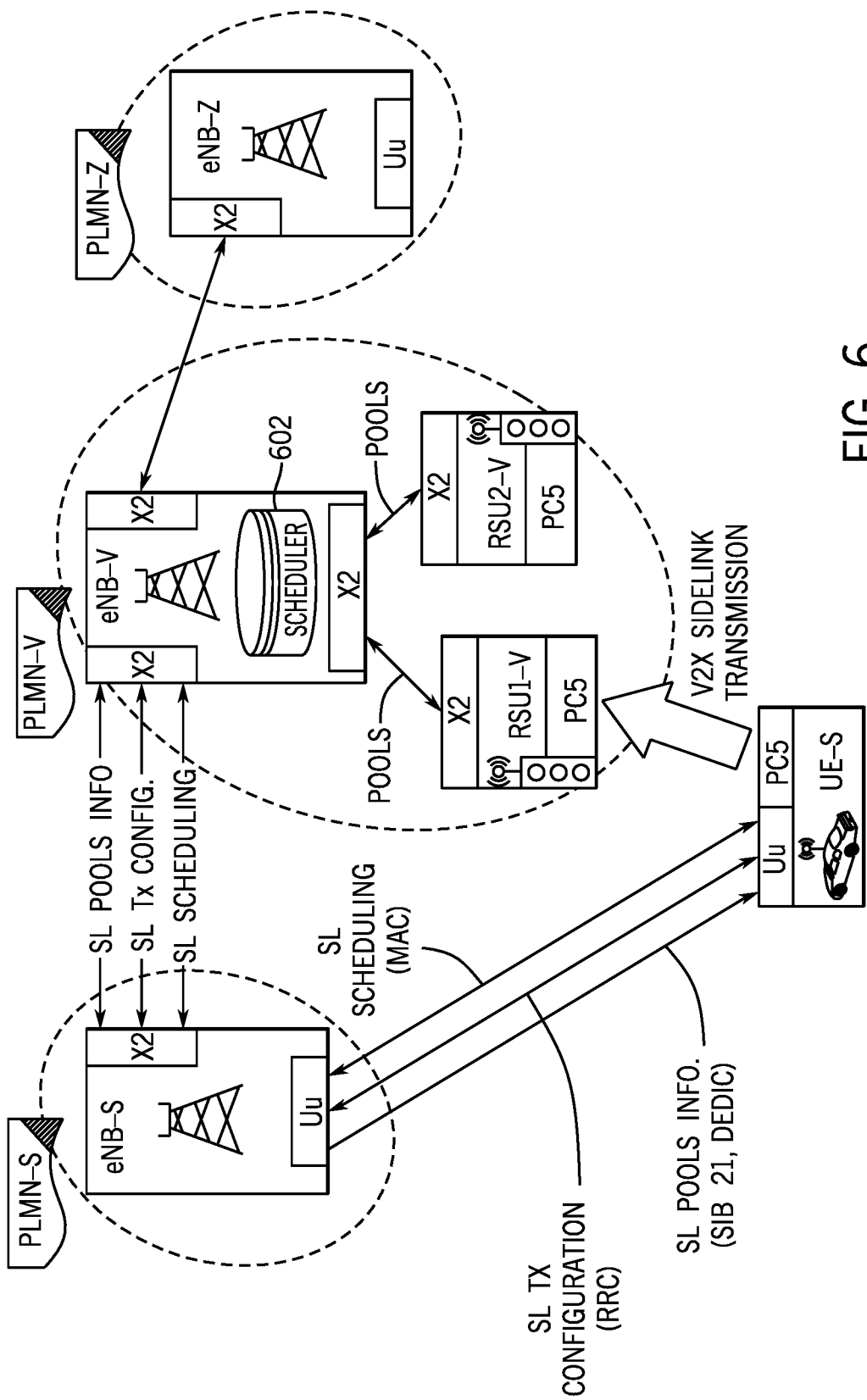
FIG. 6 is a block diagram of an example network arrangement that uses a second implementation according to further examples of the present disclosure.

FIG. 6 depicts an example arrangement to implement implementation 2b according to some techniques. The arrangement shown in FIG. 6 is similar to that shown in FIG. 4, except that a sidelink scheduler 602 is included in an eNB-V of PLMN-V, and further in FIG. 6, RSU1-V and RSU2-V are each without a sidelink scheduler. Note that in the FIG. 4 arrangement, each of RSU1-V and RSU2-V includes a respective sidelink scheduler 402 or 404.

In FIG. 6, each of RSU1-V and RSU2-V is a hybrid-type RSU that may communicate with eNB-V over an interface, such as an X2 interface.

With implementation 2b, a sidelink scheduler is included in a controlling eNB that controls a hybrid-type RSU, while sidelink allocation requests and scheduling information are transmitted via a UE's serving eNB, e.g. eNB-S or eNB-Z.

In FIG. 6, eNB-V that is part of PLMN-V providing V2X services controls RSU1-V and RSU2-V. In some examples, eNB-V may serve one or more cell(s) overlapping with the geographical zone covered by the RSUs. In the ensuing discussion, eNB-V may be referred to as a "controlling eNB," which schedules sidelink resources for UEs of all PLMNs (e.g., PLMN-S, PLMN-V, PLMN-Z) sharing RSU1-V or RSU2-V for road safety V2X services or other V2X services in each RSU radio coverage area.

In FIG. 6, each RSU1-V or RSU2-V is configured with the required pools information used for scheduling sidelink transmissions from the UEs.

The controlling eNB (eNB-V) is connected to neighbor eNBs (eNB-S, eNB-Z) of respective networks, through network interfaces such as X2 interfaces.

An eNB (e.g., eNB-S) in the PLMN (PLMN-S) serving UE-S may receive a request for V2X transmission, necessitating either an isolated or an SPS resource, from UE-S, and consequently forward the request and the associated information to the controlling eNB (eNB-V) over the corresponding X2 interface. The controlling eNB (eNB-V) may configure and allocate corresponding sidelink resources and transmit the configuration and the allocation information to the requesting eNB (eNB-S), which in turn forwards the corresponding information to the requesting UE.

In FIG. 6, SL POOLS INFO, SL TX CONFIGURATION (or SL TX CONFIG, and SL SCHEDULING information may be communicated between eNB-V, eNB-S and UE-S in a way similar to what is described with regard to FIG. 4 between RSU1-V, eNB-S and UE-S, respectively.

Figure 7:
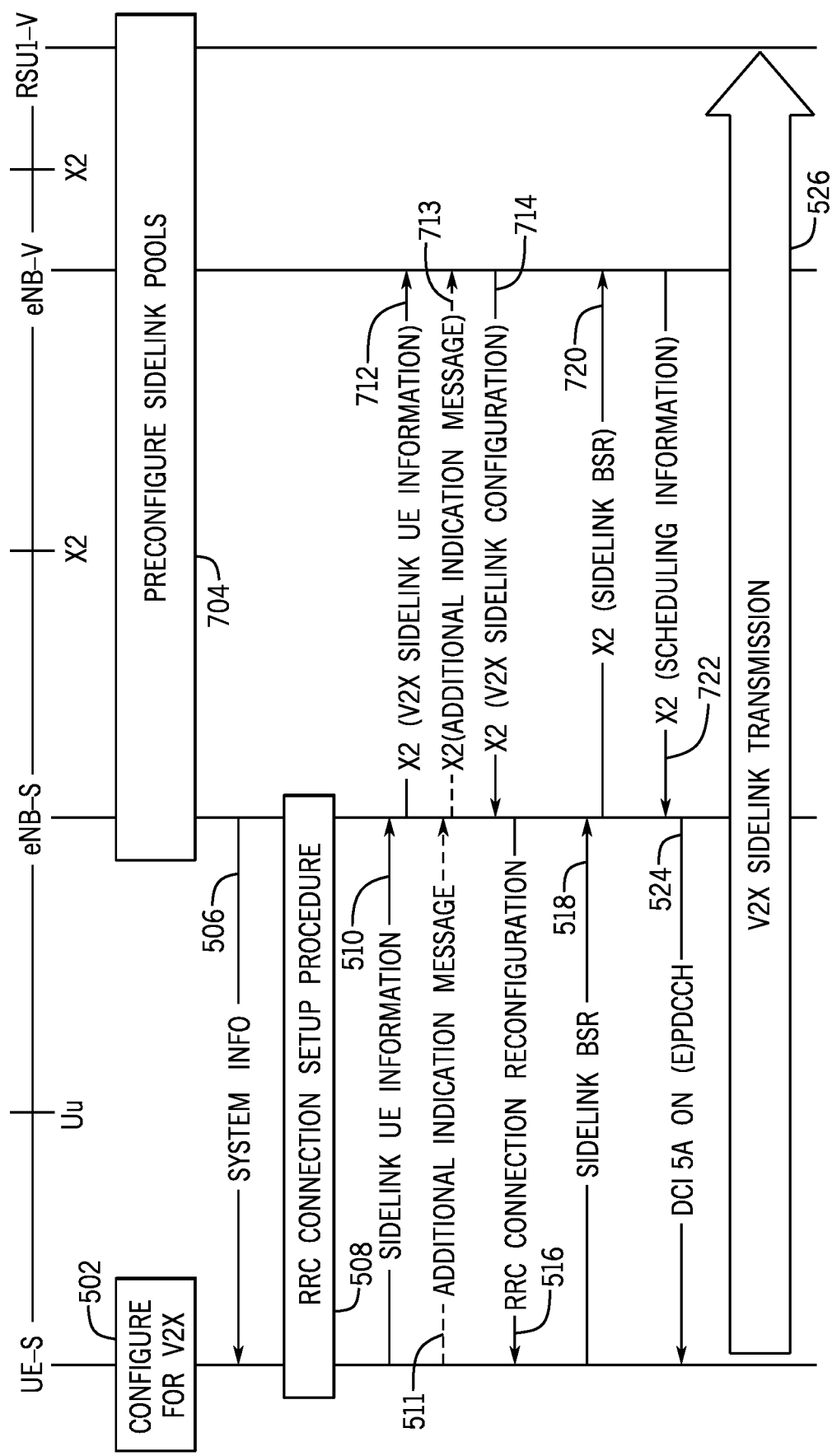
FIG. 7 is a flow diagram of a process performed in the network arrangement of FIG. 6, according to some implementations.

FIG. 7 is a message flow diagram depicting messages exchanged among UE-S, eNB-S, eNB-V, and RSU1-V and corresponding tasks, according to some examples. The tasks and messages are assigned reference numerals.

The tasks and messages in FIG. 7 that share the same reference numerals as FIG. 5 are the same as or similar to the respective tasks or messages of FIG. 5. However, in FIG. 7, messages 512, 513, 514, 520, and 522 in FIG. 5 are replaced respectively with messages 712, 713, 714, 720, and 722 in FIG. 7. Messages 712, 714, 720, and 722 are exchanged between eNB-S and eNB-V in FIG. 7, instead of between eNB-S and RSU1-V as in FIG. 5. The content of the messages 712, 714, 720, and 722 are similar to those of respective messages 512, 514, 520, and 522 in FIG. 5.

Also, in FIG. 7, the UE transmission pools information (704) is similar to the information 504 of FIG. 5, except that the information 704 is shared by the serving eNB (eNB-S) of PLMN-S, the controlling eNB (eNB-V) of PLMN-V, and RSU1-V, according to a technique of implementation 1.

In implementation 2b, the scheduling of sidelink transmission by RSU1-V can either be:

1) Local to RSU1-V. In this case, RSU transmission pools configuration, and related signaling if applicable, can be realized according to one of the pools configuration techniques of implementation 1.
2) Provided by the controlling eNB (eNB-V) of PLMN-V allowing the coordination of sidelink scheduling for several RSUs under the control of the controlling eNB (eNB-V). In this case, scheduling signaling between each RSU and the controlling eNB is performed, and can be similar to the signaling between the serving eNB (eNB-S) and the controlling eNB the (eNB-V) for UEs resource scheduling (in this case, RSU1-V can request sidelink resources to the controlling eNB.

In some examples, a cross carrier scheduling indication may be used by the eNBs to indicate to the UEs that the carrier used for V2X service is different from the frequency used by the serving PLMN (resources on the V2X carrier is scheduled by a different node).

Implementation 2c

Figure 8:
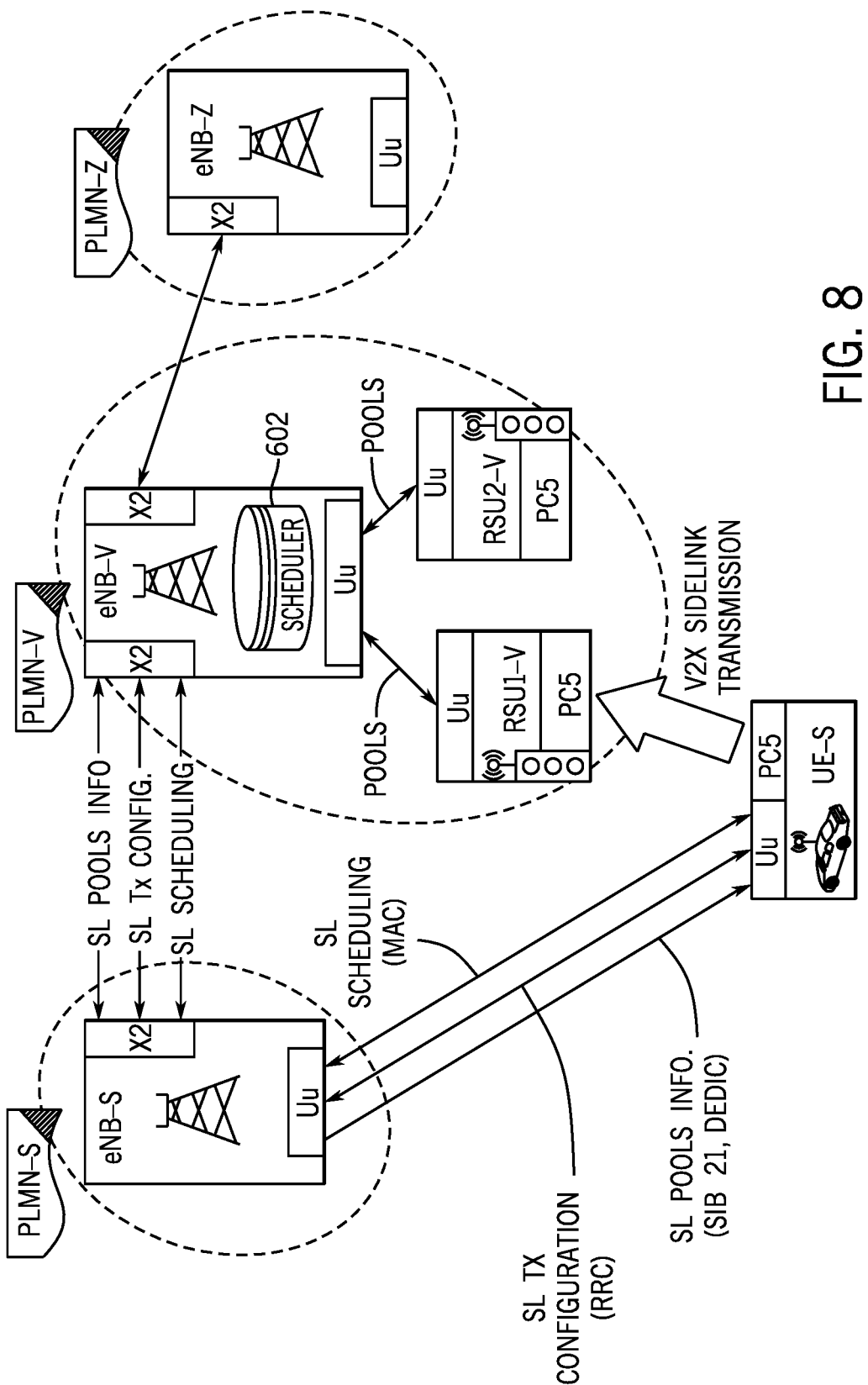
FIG. 8 is a block diagram of an example network arrangement that uses a third implementation according to further examples of the present disclosure.

FIG. 8 depicts an example arrangement to implement implementation 2c according to some techniques. The arrangement shown in FIG. 8 is a variant of the arrangement for implementation 2b shown in FIG. 6. However, in FIG. 8, each of RSU1-V and RSU2-V is a UE-type RSU that communicates with eNB-V over a respective Uu interface. RSU1-V receives V2X sidelink information from the controlling eNB via a Uu interface instead of an X2 interface.

With implementation 2c, a sidelink scheduler is included in a controlling eNB that controls a UE-type RSU, while sidelink requests allocation and scheduling information are transmitted via a UE's serving eNB, e.g. eNB-S or eNB-Z.

The controlling eNB (eNB-V) is connected to the neighbor eNBs of the respective networks, through network interfaces such as X2 interfaces.

The message flow diagram for implementation 2c and related sequencing and procedures are identical or similar to that of implementation 2a shown in FIG. 7, except that task 704 of FIG. 7 is modified to communicate UE transmission pools information over the Uu interface between the controlling eNB (eNB-V) and RSU1-V.

Implementation 3

Figure 9:
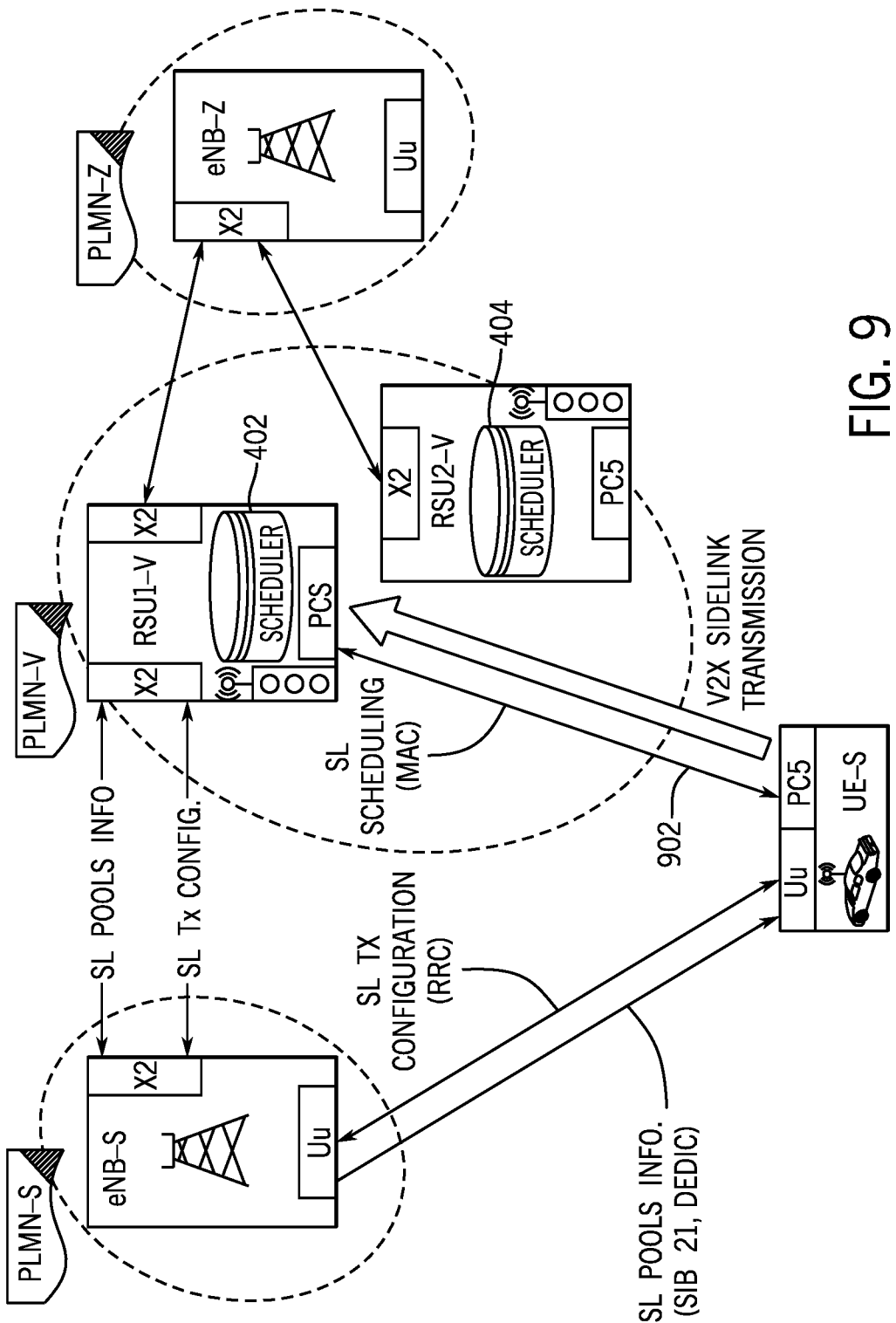
FIG. 9 is a block diagram of an example network arrangement that uses a fourth implementation according to further examples of the present disclosure.

FIG. 9 depicts an example arrangement to implement implementation 3 according to some techniques. In implementation 3, similar to implementation 2a, the sidelink scheduler 402 is included in RSU1-V, and the sidelink scheduler 404 is included in RSU2-V. Each sidelink scheduler 402 or 404 schedules sidelink resources for UEs of all PLMNs (e.g., PLMN-S, PLMN-V, PLMN-Z) sharing RSU1-V or RSU2-V, respectively, for road safety V2X services or other types of transportation services in each RSU radio coverage area.

With implementation 3, the sidelink scheduler is included in a hybrid-type RSU, and sidelink requests and scheduling information are transmitted over the PC5 interface (i.e., the requests and scheduling information can be sent directly between the RSU and the UE over a D2D radio interface such as aPC5 interface).

In implementation 3, a resource allocation technique over a PC5 interface is provided. In contrast, in implementation 2a, a resource allocation technique is provided via the serving eNB (eNB-S). In implementation 3, the UE requests sidelink resources from RSU1-V, and in response, is allocated sidelink resources by RSU1-V over the PC5 interface (SL SCHEDULING information 902 depicted in FIG. 9) sent over a radio channel such as a SL-SCH channel. The allocated sidelink resources can be described by information in a specific format, such as SCI format 1 or an equivalent SCI format, directly between the RSU and the UE without having to route the requests or responses via the UE's serving eNB.

In implementation 3, some sidelink resources to be used by the UE for initial transmissions over the PC5 interface and/or for subsequent resource requests may be pre-allocated by RSU1-V and transmitted via the UE's serving eNB. Alternatively or in addition, some scheduled sidelink resources may be based on a resource subset or (sub-)channel either predefined by the standards or configured (e.g., signaled in broadcast or dedicated messages).

In implementation 3 as shown in FIG. 9, transmission pools configuration (referred to as SL POOLS INFO) and transmission configuration information (referred to as SL TX CONFIGURATION or SL TX CONFIG) are communicated between RSU1-V, eNB-S and UE-S.

In a variant of implementation 3, part or all of sidelink transmission configuration information (SL TX CONFIGURATION) may be sent over the PC5 interface (between RSU1-V to UE-S) instead of being sent through the serving eNB. The sidelink resources for sending control information (transmission parameters, PC5 scheduling requests) may be pre-allocated by RSU1-V or may be selected autonomously by UE-S. In this case, RSU1-V may not need to be connected to the different neighbor eNBs of the respective PLMNs.

Figure 10:
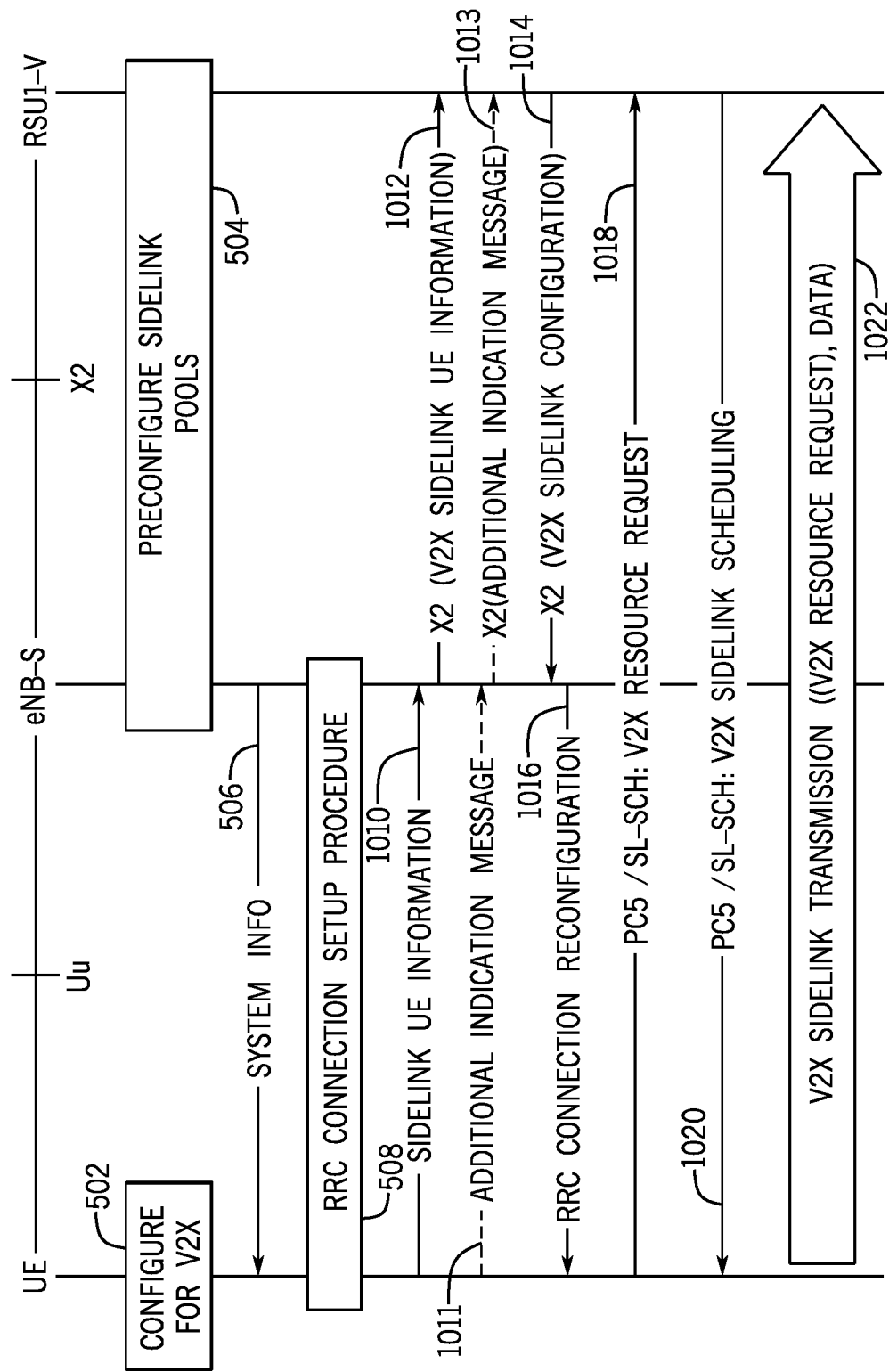
FIGS. 10 and 11 are flow diagrams of processes performed by the network arrangement of FIG. 9, according to various implementations.

FIG. 10 is a message flow diagram depicting messages exchanged among UE-S, eNB-S, and RSU1-V and corresponding tasks, according to some examples. The tasks and messages are assigned reference numerals. Tasks 502, 504, 506, and 508 in FIG. 10 are similar to the corresponding tasks of FIG. 5.

1010: Task 1010 in FIG. 10 involves UE-S sending a sidelink indication message (referred to as a SidelinkUEInformation message in some examples).

1011: Task 1011 involves UE-S possibly sending one or more additional indication messages to eNB-S, similar to task 511 of FIG. 5.

1012, 1013: Tasks 1012 and/or 1013 in FIG. 10 involves eNB-S forwarding part of or all the information included in a received indication message to the RSU1N in a second message, such as a X2 message over an X2 interface. In each of tasks 1010 and 1012, the respective messages can include a logical UE identity, which may be associated with the source Layer-2 ID of the UE. This logical UE identity may be an authenticated identity for secure sidelink transmission between the UE and the RSU. Each UE is allocated a Layer-2 ID for V2X communications over a PC5 reference point, and the Layer-2 ID is included in the source Layer-2 ID field of every frame that the UE sends on the Layer-2 link. The UE may self-assign the Layer-2 ID for the V2X communication over PC5 reference point. In other implementations, this logical UE identity may be allocated by the RSU and transmitted in tasks 1014 and 1016.

1014: In response to the X2 message (1012), RSU1-V sends an X2 response message (1014) to the requesting eNB (eNB-S) over the X2 interface. The X2 response message may include information indicating "PC5 scheduled" mode, which may be a new sidelink mode. Alternatively, the existing "scheduled" indication may be reused, for example if the legacy and the new modes cannot be both used in some scenarios.

The X2 response message (1014) can include pre-allocated sidelink resources to be used by the UE for initial transmissions over PC5 and/or for subsequent transmissions such as resource requests. The pre-allocated resources may be identified by a number of parameters (e.g. one or more frequencies, resource size, allocation interval if periodic, allocation time window, or number of grants) and may be determined by RSU1-V depending on information provided in the one or more indication messages sent in tasks 1010 and 1012, that may include QoS, periodicity, minimum or maximum transmission window duration and so forth.

The pre-allocated sidelink resources for one or more UEs may be located within an identified subset of sidelink resources in frequency and/or time, where the subset may be either predefined by applicable standards or configured (e.g., in broadcast or dedicated messages). The resources pre-allocated to a specific UE may therefore be indicated to the UE using an index or any other parameter or combination of parameters, which uniquely indicates one or more grants within the identified resources subset. This subset may be identified as one or more sidelink grants channels or sub-channels.

The pre-allocated sidelink resources may be specified for transmitting data or control information (e.g., a V2X resource request), or both.

The X2 response message (1014) may also include pools information, an MCS, as well as MAC information (similar to task 514 in FIG. 5), a logical UE identity and/or other security-related information.

1016: Upon receipt of the X2 response message (1014), eNB-S sends to UE-S a RRCConnectionReconfiguration message indicating a PC5 scheduled resource, assigning a SL-V-RNTI (or SL-V-SPS-RNTI) to UE-S, and providing the additional information received from the RSU (similar to task 516 of FIG. 5).

1018: If UE-S has been allocated sidelink resources for sending only V2X resources request, UE-S sends a V2X resource request to request a sidelink resource for data transmission, indicating the logical channel(s) information and related buffer size, similar to the information contained in a sidelink BSR.

1020: RSU1-V allocates a V2X sidelink resource to the UE-S according to the received resource request, and sends a scheduling message containing scheduling information to UE-S over the PC5 interface, for example on an SL-SCH channel. If applicable, the scheduling message may contain SPS configuration or activation information. The V2X sidelink scheduling message may include an identity identifying the UE. This may be the UE's source Layer-2 ID (or the corresponding ProSe UE ID), or any other identity that may be uniquely associated with the UE.

The scheduled sidelink resource may be specified for transmitting data or control information (e.g., a V2X resource request), or both.

1022: The scheduled UE-S transmits on SL-SCH or on another sidelink channel using the resource scheduled by RSU1-V, indicated either by the serving eNB in an RRC-ConnectionReconfiguration message (1016) or in the scheduling information received over PC5 (1020). The sidelink transmission (1022) from UE-S may contain data or control information (e.g., a V2X resource request), or both. An embedded resource request may be transmitted in the form of the information described for 1018, or may be a "more" request for which the former request parameters apply by default.

For messages sent at 1012 and 1014, a X2 message type and format may be defined or an existing message may be adapted for this purpose.

Figure 11:
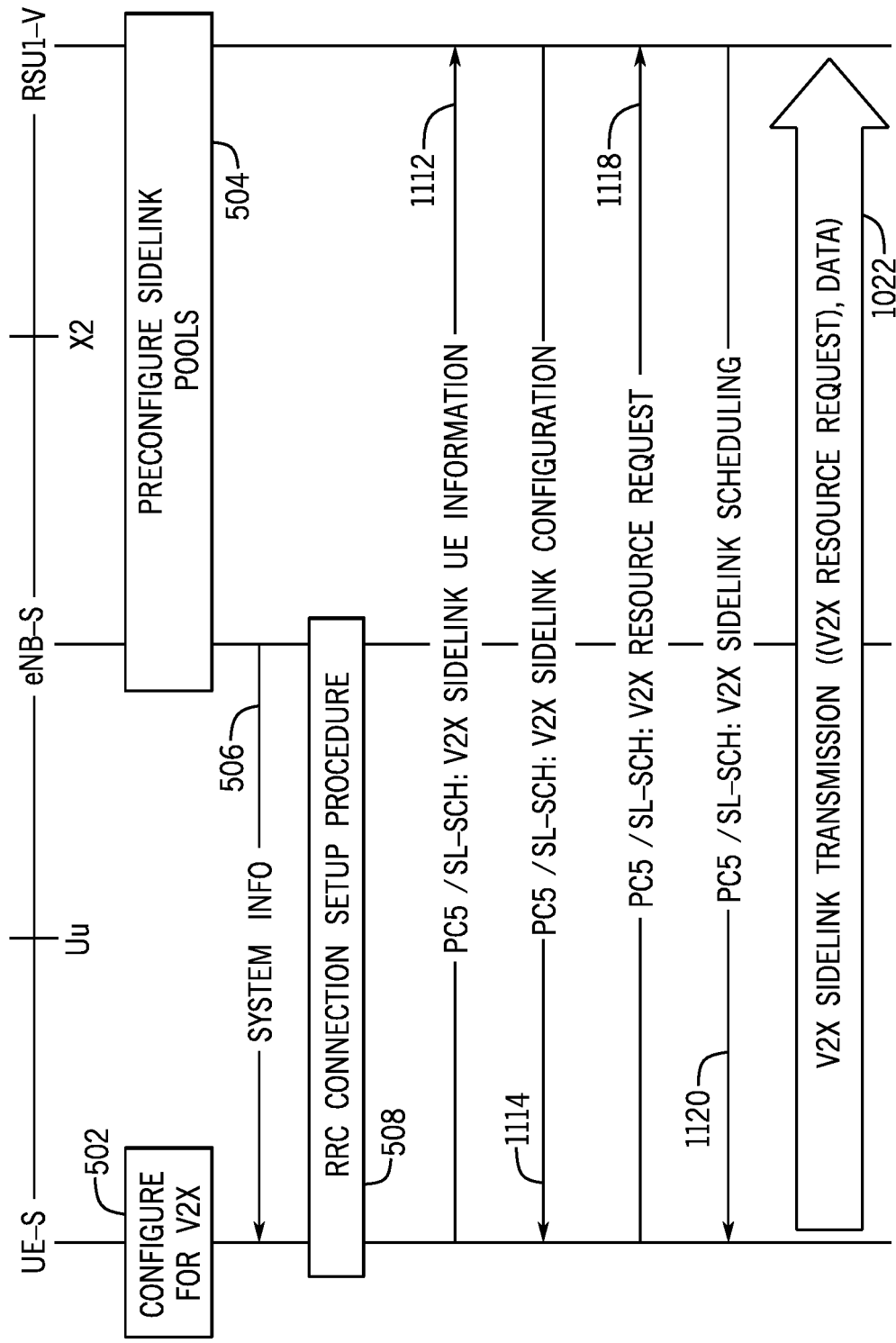

FIG. 11 shows a variant of implementation 3, which is different from the variant shown in FIG. 10. In the variant of FIG. 11, the sidelink transmission configuration is sent over the PC5 interface instead of being sent through the serving eNB, eNB-S (messages 1112, 1114, 1118, and 1120, which replace messages 1012, 1014, 1018, and 1020 in FIG. 10). Moreover, an amount of PC5 resources used for sending control information (transmission parameters, PC5 scheduling requests) may be pre-allocated by RSU1-V or may be selected autonomously by UE-S.

In the FIG. 11 variant, RSU1-V may not need to be connected to the different neighbor eNBs of the respective PLMNs.

508: Note that in FIG. 11, the UE-S that is in the RRC-IDLE state does not have to establish an RRC connection for transmitting over the PC5 interface. However, UE-S may establish an RRC connection if desired.

1112: UE-S sends over the PC5 interface an indication message, referred to as a V2X Sidelink UE Information message in some examples, indicating to RSU1-V that UE-S is interested in V2X sidelink communication on the V2X frequency, and possibly including a list of V2X services. UE-S may send additional indication messages. The one or more indication messages may indicate whether UE-S is interested in dynamic, semi-persistent, or other sidelink transmission types that may be defined.

In addition, UE-S may include a logical UE identity, which may be associated with the source Layer-2 ID of the UE. This logical UE identity may be an authenticated identity for secure sidelink transmission between UE-S and RSU1-V. In other implementations, this logical UE identity may be allocated by RSU1-V and transmitted in message 1114. UE-S may also include other security-related information.

1114: In response to an indication message such as a V2X Sidelink UE Information message, RSU1-V sends to UE-S V2X sidelink configuration information that may include pools information, an MCS, as well as MAC information (similar to message 514 of FIG. 5), a logical UE identity and/or other security-related information.

RSU1-V may include pre-allocated sidelink resources to be used by UE-S for initial transmissions over PC5 and/or for subsequent transmissions such as resource requests. The pre-allocated resource may be determined by RSU1-V depending on information provided in the one or more indication messages such as the sidelink UE information in message 1112.

Implementation 4a

Implementation 4a can be used in conjunction with the implementations described above. Implementation 4a refers to a technique to allow a sidelink scheduler to take into account inter-PLMN scheduling latency. Implementations 2a, 2b, and 2c introduce an additional network node (eNB-S of PLMN-S) in the data path between the sidelink scheduler and the UE (UE-S) being scheduled.

Even though the performance of a network interface such as an X2 interface should be such that the additional delay is minimal, e.g., for an LTE-Advanced grade network, a technique may be introduced to take such additional latency into account, and ensure that the scheduled UE receives the DCI for sidelink transmission on time so that the scheduled UE is able to use the scheduled resource and transmit in the allocated subframe.

In some examples, the technique can include configuring, estimating, measuring, and negotiating delay components of a transmission path including an X2 interface between different PLMNs. The technique can further include determining a minimum time before the resource is scheduled and/or a maximum transmission delay of the scheduling information so that the scheduling information is received and processed in due time by the scheduled UE for using the granted resource for sidelink transmission.

Generally, a sidelink scheduler (that sends a scheduling information for a sidelink resource for use by a UE in the direct wireless transmission) uses delay information relating to communication over an interface between the first and second networks, in determining timing of the scheduling information.

In some examples, the following parameters and definitions are considered:
- SF1: subframe in which the scheduling information is generated and transmitted by the sidelink scheduler (located in an RSU or an eNB of PLMN-V);
- tX2: delay for transmission of the scheduled information over an X2 interface or a similar interface between the sidelink scheduler (located in the RSU or eNB in PLMN-V) and the serving eNB (in PLMN-S), including inherent processing time;
- tUu: delay transmission of the DCI over the a Uu interface or a similar interface between the serving eNB and the UE;
- rt1: UE reaction time;
- SF2: subframe at which the initial sidelink transmission is granted over PC5.

In order to guarantee that the scheduled UE receives the DCI, or more generally the scheduling information, for sidelink transmission on time to be able to use the granted resource and transmit in the allocated subframe, SF2 is set in the sidelink scheduler such that:

$$SF2 \geq SF1 + tX2 + tUu + rt1.$$

It should be appreciated that different formulas involving different timing components may be used to compute the overall transmission delay over the path that should be considered.

Knowing or estimating the overall delay at the network node including the sidelink scheduler would allow the sidelink scheduler to determine a minimum value of SF2 appropriately. Maximum values for the different delay components are specified (e.g., rt1) or can be evaluated (e.g., tUu, tX2) and configured per interface instance or per connected PLMN.

Additionally, or alternatively, techniques may be implemented to measure or estimate the delay components, e.g., sending one or more "ping" or other solicitation commands, or one or more acknowledged commands over the X2 interface, for determining the round trip times and deriving the corresponding latency.

Additionally, or alternatively, a maximum DCI transmission delay may be negotiated, requested or enforced by the sidelink scheduler to the serving eNB in PLMN-S, or more generally be configured or agreed between the interacting PLMNs, in order to cap the delay incurred at the Uu interface.

Implementation 4b

Implementation 4b routes UE requests or other messages to the appropriate RSU.

As a serving eNB may be connected to several RSUs or controlling eNBs, or a controlling eNB may be connected to several RSUs, UEs requests or other messages may have to be routed to the appropriate RSU or the appropriate controlling eNB in the V2X network.

In implementations 2a, 2b, 2c, or 3, if the serving eNB (in PLMN-S) is connected to several RSUs (implementations 2a, 3) or to several controlling eNBs (implementations 2b, 2c) in PLMN-V, then the serving eNB has to route UE requests or other messages toward the appropriate RSU or the appropriate controlling eNB. Similarly, where applicable, the controlling eNB may be connected to several RSUs, and in this case the controlling eNBs has to route UE requests or other messages toward the appropriate RSU.

Different variants are proposed for this purpose, where the routing can be based on:
1) The V2X destination Layer-2 ID mapped to a given V2X service. The V2X destination Layer-2 ID values can be mapped to different V2X services if the destination Layer-2 ID values can be discriminating of different RSUs within the coverage area of an eNB. In this variant, the destination Layer-2 ID may be identified by a field included in the BSR, e.g. a destination index, or by an information associated to any message intended to a given RSU.
2) An RSU source Layer-2 ID (or a corresponding ProSe UE ID) broadcast by the RSUs. In this case, the RSU source Layer-2 ID may be sent as RRC information (e.g., within the SidelinkUEInformation message or in another RRC message). The RSU source Layer-2 ID may have to be updated or sent when the UE enters the coverage area of an RSU. Alternatively, the RSU source Layer-2 ID may be included in SR/BSR information.
3) The current UE location. A mapping table containing geo-location information related to connected RSUs or a controlling eNB can be used to map the current UE location to an appropriate RSU or controlling eNB. As it is assumed that V2X UEs in coverage have to transmit position information to the network, the routing to the appropriate RSU may be based on reported UE location. The serving eNB or the controlling eNB, depending on the interconnectivity architecture applicable to the considered implementation, may be configured with the mapping table containing geo-location information of RSUs (e.g., RSU geographical position and radio coverage area information such as radius or coverage area geo-description, or any other relevant information). A similar mapping table may be configured in the serving eNB, containing geo-location information of the connected controlling eNBs for the applicable solutions.

Implementation 4c

Implementation 4c pre-allocates a set of sidelink resources that may be used for future sidelink resources allocations to the requesting eNB of PLMN-S.

Alternatively, or in addition to the techniques described for implementations 2a, 2b, and 2c, instead of obtaining a sidelink resource allocation for each and every resource request, the serving eNB may obtain a set of sidelink resources from the RSU (implementation 2a) or the controlling eNB (implementation 2b or 2c) to be used by the serving eNB for future allocation of sidelink resources to requesting UEs. In implementation 4c, the sidelink scheduler included in the RSU or in the controlling eNB essentially transfers the ownership of a set of sidelink resources on a semi-static (i.e., temporary) basis to the requesting eNB, which takes charge of scheduling these sidelink resources to the requesting UEs.

The set of sidelink resources may be pre-allocated by the RSU, in response to receiving the sidelink resource request from the eNB of PLMN-S or in response to receiving sidelink resource requests from the eNB for multiple UEs. The set of sidelink resources may be used by the eNB to individually schedule sidelink resources to one or more UEs. With implementation 4c, in response to receiving a sidelink resource request from a UE, the eNB schedule resources from within the set of sidelink resources that it has obtained from the RSU.

A benefit of implementation 4c is that it would avoid a full round-trip delay for future resource allocation requests as long as the set contains free resources and is valid. A new set may be requested and/or allocated when all free resources in the previously obtained set are exhausted or when the set is determined to be no more valid (e.g. a resource validity time has expired).

Figure 12:
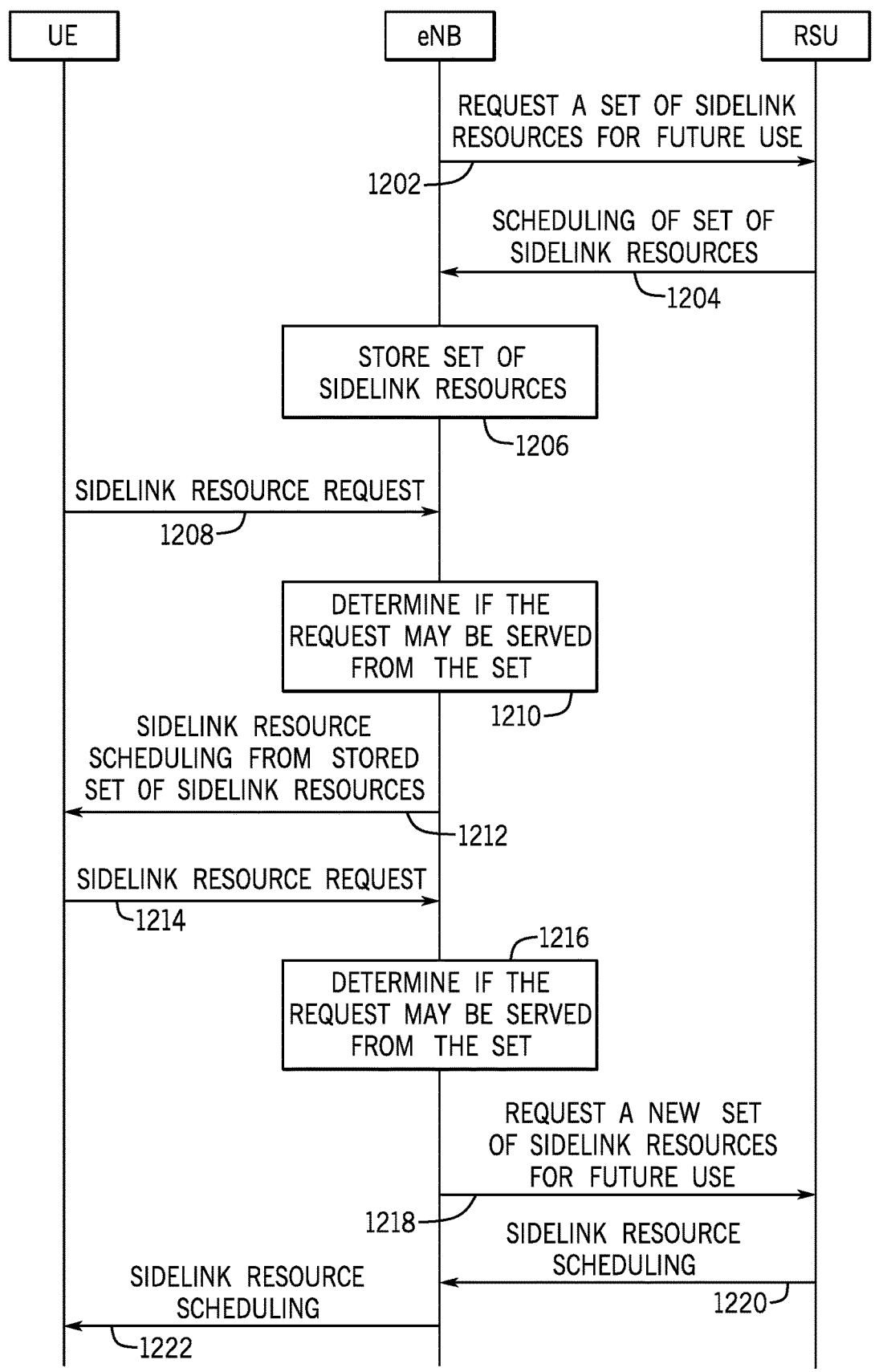
FIG. 12 is a flow diagram of a process performed in a network arrangement, according to additional implementations.

FIG. 12 is a message flow diagram of implementation 4c.

1202: An eNB sends, to an RSU, a request for a set of sidelink resources for future use.

1204: Upon receiving the request for sidelink resources from the eNB, the RSU may adopt implementation 4c depending on one or more factors such as:
- available sidelink resources,
- estimated PC5 traffic load,
- traffic pattern or trend or other information provided by the eNB,
- traffic pattern or requests history observed at the RSU,
- estimated, calculated or configured delay, or timing components, of the transmission between the RSU node and the UE (see implementation 4a),
- a configured or requested time window for the multiple allocation,
- and so forth.

Similarly, implementation 4c may be adopted by the eNB based on the following factors:
- a current sidelink resource request frequency from one or more UEs,
- an estimated sidelink resource demand in the future,
- a number of UEs indicating interest in sidelink services (e.g., UEs indicating sidelink interest or V2X interest indication),
- QoS, priority, PPPP (ProSe Per-Packet Priority) of the traffic from UEs that are currently interested in sidelink,
- and so forth.

1204: In response to the request from the eNB, the RSU sends scheduling information for a set of sidelink resources to the eNB for use in processing future sidelink requests from UEs. The scheduling information can include an identification for the set of sidelink resources, and validity information for each sidelink resource. The set of sidelink resources obtained by the eNB may include a resource pool which may be valid for a specified time duration. The resource pool may include either a set of frequency subchannels or a set of subframes or a combination of both. The resource pool may contain resources that are either periodic or non-periodic.

1206: The eNB stores the set of sidelink resources received from the RSU in a storage medium of the eNB. The eNB can also store the validity information sidelink resources in the set.

1208: A UE sends a first sidelink resource request to the eNB.

1210: In response to receiving the first sidelink resource request from the UE, the eNB can determine if the request may be served by using the resources from the set of sidelink resources received from the RSU.

1212: If the resources can be served using the set of sidelink resources, the eNB can send scheduling information a from the set of sidelink resources, in response to the first sidelink resource request from the UE. The eNB may mark the resources scheduled to the UE as granted or used.

1214: The UE sends a second sidelink resource request to the eNB.

1216: In response to receiving the second sidelink resource request from the UE, the eNB can determine if the second sidelink request may be served by using the resources from the set of sidelink resources received from the RSU.

1218: If not, for example because all resources from the set have been used or their validity time has expired, then the eNB may send a new sidelink resource request for new sidelink resources from the RSU.

1220: In response to the request sent at 1218, the RSU sends a sidelink resource grant to the eNB.

1222: The eNB forwards the sidelink resource grant to the UE, in response to the second sidelink resource request from the UE.

The eNB and/or RSU may fall back to a non-pre-allocated resources allocation mode when conditions for using the technique described above are no more fulfilled.

System/Device Architecture

Figure 13:
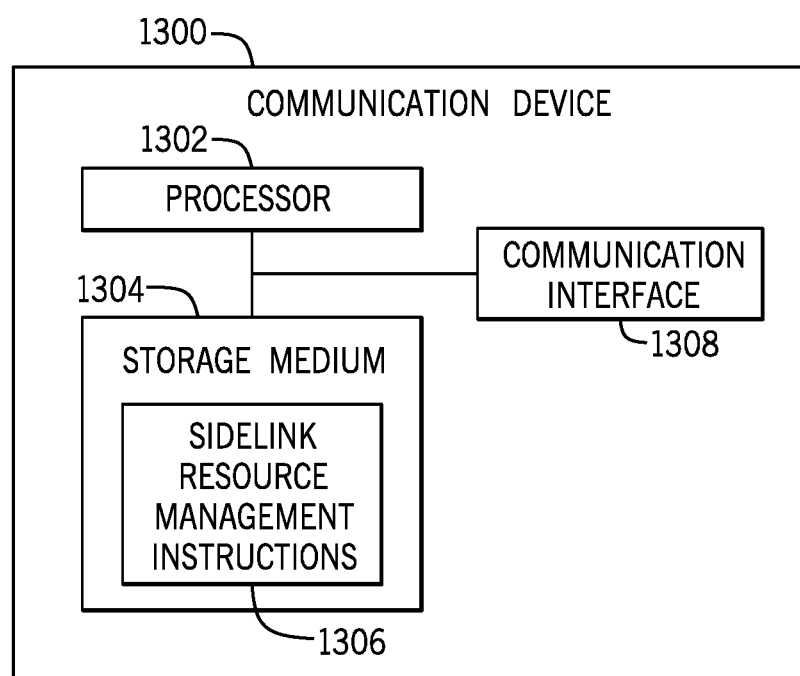
FIG. 13 is a block diagram of an example communication device, according to some implementations.

FIG. 13 is a block diagram of a communication device 1300, which can be any one of a UE, an RSU, a wireless access network node (e.g., an eNB), or other network node. The communication device 1300 includes a processor 1302 (or multiple processors). A processor can include a microprocessor, a core of a multi-core microprocessor, a microcontroller, a programmable integrated circuit, a programmable gate array, or another hardware processing circuit.

The communication device 1300 further includes a non-transitory machine-readable or computer-readable storage medium 1304 storing machine-readable instructions that are executable on the processor 1302 to perform specified tasks. Instructions executable on a processor can refer to instructions executable on a single processor or multiple processors.

The machine-readable instructions include sidelink resource management instructions 1306 that are executable on the processor 1302 to perform the tasks discussed above, in some examples.

The communication device 1300 further includes a communication transceiver 1308, which can be a wireless transceiver (e.g., a radio frequency or RF transceiver) to communicate over a wireless network, or a wired transceiver to communicate over a wired network.

The storage medium 1304 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   sending, by a scheduler in a first network node of a first network in response to a first request from a user equipment (UE) served by a second network, scheduling information to a second network node of the second network, the scheduling information granting a resource for use by the UE for a direct wireless transmission between the UE and a wireless device, wherein the first network is different from the second network, and wherein the sending of the scheduling information to the second network node of the second network is to cause the second network node of the second network to send the scheduling information to the UE; and
   using, by the scheduler that sends the scheduling information granting the resource for use by the UE in the direct wireless transmission, delay information relating to communication over an interface between the first network node and the second network node, in determining a timing of the scheduling information.

2. The method of claim 1, further comprising:
   sending, by the first network node of the first network in response to a second request from the UE, a transmission configuration to the second network node of the second network, the transmission configuration relating to a configuration used for the direct wireless transmission between the UE and the wireless device.

3. The method of claim 2, wherein the transmission configuration comprises one or more of a parameter relating to a modulation and coding scheme (MCS), a Medium Access Control (MAC) configuration parameter to configure a MAC layer, and priority values associated with logical channels to be used.

4. The method of claim 2 wherein the second request from the UE comprises a UE information message.

5. The method of claim 1, wherein the first network node is the wireless device comprising the scheduler that produced the scheduling information.

6. The method of claim 1, wherein the wireless device is a roadside unit (RSU).

7. The method of claim 1, wherein the direct wireless transmission comprises a sidelink transmission.

8. The method of claim 1, wherein the direct wireless transmission is a Vehicle-to-Everything (V2X) sidelink transmission.

9. The method of claim 1, wherein the first network node is a base station comprising the scheduler that produced the scheduling information.

10. The method of claim 9, wherein the wireless device is a roadside unit (RSU) served by the first network, and wherein the RSU is to communicate over an X2 interface or a Uu interface with the base station.

11. The method of claim 1, wherein the scheduling information comprises one or more of a frequency resource, a time resource, a scheduling interval, or a scheduling time duration.

12. The method of claim 1, further comprising:
    sending, by the first network node to the second network node, resource pool information relating to a pool of resources provisioned by the first network for direct wireless transmissions.

13. The method of claim 1, further comprising:
    determining, by the scheduler, the delay information based on a delay over the interface between the first network node and the second network node,
    wherein the scheduler sends the scheduling information according to the determined timing.

14. The method of claim 13, comprising:
    determining, by the scheduler, the delay information based on a delay over an interface between the second network node and the UE.

15. The method of claim 14, comprising:
    determining, by the scheduler, the delay information further based on a reaction time of the UE to the scheduling information.

16. The method of claim 1, further comprising:
    selecting, by the second network node based on a factor, the first network node from among a plurality of network nodes; and
    routing, by the second network node, the first request from the UE to the first network node.

17. The method of claim 1, further comprising:
    indicating, by the first network node to the second network node, a set of resources for use by the second network node in granting a request from a UE for a resource to perform a direct wireless transmission with the wireless device.

18. The method of claim 1 wherein the first request from the UE comprises buffer status reporting (BSR) information.

19. The method of claim 1, wherein the first network is a first public land mobile network (PLMN), and the second network is a second PLMN different from the first PLMN.

20. A first network node of a first network, comprising:
    a communication interface to communicate with a second network node of a second network that serves a user equipment (UE), wherein the first network is different from the second network; and
    at least one processor configured to:
       send, from a scheduler in the first network node of the first network in response to a request from the UE served by the second network, scheduling information to the second network node of the second network, the scheduling information granting a resource for use by the UE for a direct wireless transmission between the UE and a wireless device, and wherein the sending of the scheduling information to the second network node of the second network is to cause the second network node of the second network to send the scheduling information to the UE; and
       use, by the scheduler, delay information relating to communication over an interface between the first network node and the second network node, in determining a timing of the scheduling information.

21. The first network node of claim 20, wherein the at least one processor is configured to:
    determine, by the scheduler, the delay information further based on a delay over the interface between the first network node and the second network node, and a delay over an interface between the second network node and the UE.

22. A non-transitory machine-readable storage medium comprising instructions that upon execution cause a first network node of a first network to:

send, from a scheduler in the first network node of the first network in response to a request from a user equipment (UE) served by a second network, scheduling information to a second network node of the second network, the scheduling information granting a resource for use by the UE for a direct wireless transmission between the UE and a wireless device, wherein the first network is different from the second network, and wherein the sending of the scheduling information to the second network node of the second network is to cause the second network node of the second network to send the scheduling information to the UE; and use, by the scheduler, delay information relating to communication over an interface between the first network node and the second network node, in determining a timing of the scheduling information.

23. The non-transitory machine-readable storage medium of claim 22, wherein the instructions upon execution cause the first network node to:

determine, by the scheduler, the delay information based on a delay over the interface between the first network node and the second network node.

24. The non-transitory machine-readable storage medium of claim 23, wherein the instructions upon execution cause the first network node to:

determine, by the scheduler, the delay information further based on a delay over an interface between the second network node and the UE.

\* \* \* \* \*